US011052932B2

(12) United States Patent
DeBry et al.

(10) Patent No.: US 11,052,932 B2
(45) Date of Patent: Jul. 6, 2021

(54) FOLDABLE TRICYCLE

(71) Applicant: RADIO FLYER INC., Chicago, IL (US)

(72) Inventors: Garrett DeBry, Chicago, IL (US); David Packowitz, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 114 days.

(21) Appl. No.: 16/144,385

(22) Filed: Sep. 27, 2018

(65) Prior Publication Data

US 2019/0092366 A1  Mar. 28, 2019

Related U.S. Application Data

(60) Provisional application No. 62/563,765, filed on Sep. 27, 2017.

(51) Int. Cl.
| | |
|---|---|
| *B62B 7/06* | (2006.01) |
| *B62B 7/04* | (2006.01) |
| *B62K 9/02* | (2006.01) |
| *B62K 15/00* | (2006.01) |
| *B62K 21/00* | (2006.01) |

(52) U.S. Cl.
CPC ............. *B62B 7/044* (2013.01); *B62B 7/042* (2013.01); *B62B 7/066* (2013.01); *B62K 9/02* (2013.01); *B62K 15/006* (2013.01); *B62K 21/00* (2013.01); *B62B 2205/26* (2013.01); *B62B 2301/04* (2013.01)

(58) Field of Classification Search
CPC .. B62B 7/06; B62B 7/062; B62B 7/12; B62B 7/044; B62K 15/006

USPC .......................................... 280/647, 650, 287
See application file for complete search history.

(56) References Cited

U.S. PATENT DOCUMENTS 4,079,957 A * 3/1978 Blease ..................... B62K 9/02
                                                          280/278
4,457,529 A * 7/1984 Shamie .................... B62K 5/02
                                                          280/278

(Continued)

FOREIGN PATENT DOCUMENTS

| CN | 105539691 | 5/2016 |
| CN | 104691686 | 3/2017 |
| JP | 2005008053 | 1/2005 |

OTHER PUBLICATIONS

International Search Report of PCT/US2018/53122 dated Dec. 6, 2018 (2 pages).

(Continued)

*Primary Examiner* — Jeffrey J Restifo
(74) *Attorney, Agent, or Firm* — Barnes & Thornburg LLP

(57) ABSTRACT

A foldable tricycle is provided and has a frame having a first end and a second end, a seat connected to the frame, a front wheel adjacent the first end of the tricycle, and a rear wheel adjacent the second end of the tricycle. A head tube housing is provided adjacent the first end of the main frame, and a fork is provided adjacent the first end of the tricycle. The front wheel is rotatedly secured to the fork. A stem extends from the fork and supports a handlebar, wherein a portion of the head tube housing is slidingly connected to the stem, and wherein the tricycle can be manipulated between a use position and a folded position by sliding a portion of the head tube toward the handlebar.

22 Claims, 23 Drawing Sheets

(56) References Cited

U.S. PATENT DOCUMENTS

| | | | | |
|---|---|---|---|---|
| 4,546,991 A * | 10/1985 | Allen | ............... | B62K 9/02 280/278 |
| 4,657,270 A * | 4/1987 | Allen | ............... | B62K 13/00 280/7.1 |
| 6,152,473 A * | 11/2000 | Shih | ............... | B62K 15/008 280/278 |
| 6,530,589 B1 * | 3/2003 | Ma | ............... | B62K 9/00 280/270 |
| 6,575,486 B2 * | 6/2003 | Ma | ............... | B62K 9/02 280/282 |
| 6,609,723 B2 * | 8/2003 | Chuang | ............... | B62K 9/02 280/278 |
| 6,935,649 B2 * | 8/2005 | Lim | ............... | B62H 7/00 280/278 |
| 6,966,572 B2 * | 11/2005 | Michelau | ............... | B62K 9/02 280/282 |
| 8,439,385 B2 * | 5/2013 | Baron | ............... | B62K 5/02 280/288.4 |
| 8,517,406 B2 * | 8/2013 | Diekman | ............... | B62K 15/006 280/278 |
| 8,844,960 B2 * | 9/2014 | Young | ............... | B62K 9/02 280/278 |
| 9,114,842 B2 * | 8/2015 | Bartels | ............... | B62H 7/00 |
| 9,493,205 B2 * | 11/2016 | Ben Meir | ............... | B62K 15/00 |
| D777,607 S * | 1/2017 | Fitzwater | ............... | D12/112 |
| 9,550,540 B1 * | 1/2017 | Wang | ............... | B62J 11/00 |
| 9,580,131 B1 * | 2/2017 | Wu | ............... | B62K 15/008 |
| D787,378 S * | 5/2017 | Ostergaard | ............... | D12/112 |
| 9,789,893 B2 * | 10/2017 | Young | ............... | B62B 7/12 |
| 9,981,679 B2 * | 5/2018 | Baron | ............... | B62B 7/08 |
| 10,336,394 B2 * | 7/2019 | Fitzwater | ............... | B62B 7/044 |
| 10,442,490 B2 * | 10/2019 | Baron | ............... | B62K 5/06 |
| 10,450,027 B2 * | 10/2019 | Kistemaker | ............... | B62J 25/00 |
| 10,501,141 B2 * | 12/2019 | Cohen | ............... | B62K 13/00 |
| 10,683,026 B2 * | 6/2020 | Baron | ............... | B62B 5/087 |
| 2013/0056949 A1 * | 3/2013 | Bricker | ............... | B62M 1/38 280/259 |
| 2014/0103616 A1 * | 4/2014 | Young | ............... | B62K 9/02 280/278 |
| 2016/0355230 A1 * | 12/2016 | Fitzwater | ............... | B62B 9/26 |
| 2018/0244335 A1 * | 8/2018 | Baron | ............... | B62M 1/24 |

OTHER PUBLICATIONS

Written Opinion of the International Searching Authority of PCT/US2018/53122 dated Dec. 6, 2018 (13 pages).
International Preliminary Report on Patentability of PCT/US2018/53122 dated Mar. 31, 2020 (1 pages).
Written Opinion of the International Searching Authority of PCT/US2018/53122 dated Mar. 31, 2020 (13 pages).

* cited by examiner

FOLDABLE TRICYCLE

CROSS-REFERENCE TO RELATED APPLICATIONS

This application claims the benefit of U.S. Provisional Patent Application No. 62/563,765, filed Sep. 27, 2017, which is expressly incorporated herein by reference and made a part hereof.

FEDERALLY SPONSORED RESEARCH OR DEVELOPMENT

Not Applicable.

TECHNICAL FIELD

The present disclosure generally relates to a tricycle, and more particularly to a tricycle that has a parent steering system and that folds into a compact package.

BACKGROUND

Folding tricycles are well known in the art. While such tricycles, according to the prior art, provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a foldable tricycle.

The disclosed technology further relates to a foldable tricycle, comprising: a frame having a first end and a second end, the second end supporting at least one rear wheel; a seat connected to the frame; a head tube housing adjacent the first end of the frame; a fork adjacent the first end of the tricycle and a front wheel rotatedly secured to the fork; and, a stem extending from the fork and supporting a handlebar, wherein a portion of the head tube housing is slidingly connected to the stem, and wherein the tricycle can be manipulated between a use position and a folded position by sliding a portion of the head tube toward the handlebar.

The disclosed technology further relates to a foldable tricycle comprising: a frame having a first end and a second end; a front wheel adjacent the first end of the tricycle, the front wheel being supported by a fork; a rear wheel adjacent the second end of the tricycle; a pivot assembly adjacent a first end of the frame, wherein the tricycle is pivotable about the pivot assembly to transition between a use position and a folded position, and wherein the fork and frame are in different relative locations in the folded and use positions; and, a release mechanism adjacent the second end of the frame, wherein the release mechanism has a first lock position to retain the tricycle in the use orientation, and wherein the release mechanism has a second lock position to retain the tricycle in the folded orientation.

The disclosed technology further relates to a foldable tricycle comprising: a frame having a first end and a second end, the second end operably supporting at least one rear wheel; a seat connected to the frame; a head tube housing adjacent the first end of the frame; a fork rotatedly secured to the tricycle, the fork rotatedly supporting a front wheel; a first release mechanism adjacent the first end of the frame; and, a second release mechanism adjacent the second end of the frame, wherein the tricycle can be manipulated between a use position and a folded position following actuation of the first and second release mechanisms.

The disclosed technology further relates to a foldable tricycle comprising: a frame having a first end and a second end; a fork adjacent the first end of the tricycle and a front wheel rotatedly secured to the fork; a rear wheel adjacent the second end of the tricycle; a pivot assembly adjacent a first end of the frame, wherein the tricycle is pivotable about the pivot assembly to transition between a use position and a folded position; a parent steer handle removably secured adjacent the second end of the frame; a forward steering rod operably connected to the fork; a rear steering rod operably connected to the parent steer handle, wherein the rear steering rod is pivotally connected to the forward steering rod; and, a release mechanism having a lock that prevents the pivot assembly from pivoting the frame to transition the tricycle to the folded orientation when the lock is in a first position, and the release mechanism transitioning the lock to a second position to allow the pivot assembly to pivot the frame to transition the tricycle to the folded position from the use position.

The disclosed technology further relates to a foldable tricycle comprising: a frame having a first end and a second end; a seat connected to the frame; a front wheel adjacent the first end of the tricycle; a rear wheel adjacent the second end of the tricycle; a pivot assembly connected to the frame, wherein the tricycle is pivotable about the pivot assembly to transition between a use position and a folded position; and, a restraint hoop connected to the seat, the restraint hoop having a first hinge and a second hinge, wherein the restraint hoop automatically pivots about the first and second hinges to a folded position during the transition of the tricycle from the use position to the folded position.

The disclosed technology further relates to a foldable tricycle wherein the head tube housing comprises an upper head tube housing and a lower head tube housing, wherein the upper head tube housing is slidingly connected to the stem, and wherein the frame can be repositioned from a use position to a folded position by sliding the upper head tube housing toward the handlebar.

The disclosed technology further relates to a foldable tricycle wherein the portion of the head tube housing that is slidingly connected to the stem is able to traverse axially about a length of the stem.

The disclosed technology further relates to a foldable tricycle having a first release mechanism adjacent the first end of the frame, and a second release mechanism adjacent the second end of the frame, wherein the tricycle can be manipulated between the use position and the folded position following actuation of the first and second release mechanisms.

The disclosed technology further relates to a foldable tricycle wherein the first release mechanism comprises a release button, a locking plate engageable by the release button, and a locking pin, and wherein the locking plate operates to transition the locking pin from a locked position to an unlocked position to allow the head tube housing to slide axially on the stem.

The disclosed technology further relates to a foldable tricycle wherein the release mechanism comprises a release button, a receiver connected to the frame, the receiver having a first receiving position and a second receiving position, and a release member, the release button being connected to the release member to have the release member separately engage the receiver in the first receiving position and the second receiving position.

The disclosed technology further relates to a foldable tricycle wherein the second release mechanism comprises a release button, a receiver connected to the frame, the receiver having a first receiving position, and a release member, the release button being connected to the release member to have the release member selectively disengage the receiver at the first receiving position to allow a back of the seat to pivot toward a bottom of the seat.

The disclosed technology further relates to a foldable tricycle wherein the release member is engaged with the receiver in the first receiving position when the tricycle is locked in the use position, and wherein the release member is engaged with the receiver in the second receiving position when the tricycle is locked in the folded position.

The disclosed technology further relates to a foldable tricycle having a release mechanism operably secured to the frame, wherein the release mechanism has a first lock position to retain the tricycle in the use position, and wherein the release mechanism has a second lock position to retain the tricycle in the folded position.

The disclosed technology further relates to a foldable tricycle having a pivot assembly between the frame and the head tube, wherein the tricycle is pivotable about the pivot assembly to transition between the use position and the folded position.

The disclosed technology further relates to a foldable tricycle having a steering handle removably secured adjacent the second end of the frame, a first end of a rear steering rod operably connected to the parent steer handle, and a first end of a forward steering rod operably connected to the fork, wherein a second end of the rear steering rod is pivotally connected to a second end of the forward steering rod to provide for steering capabilities in a folding tricycle.

The disclosed technology further relates to a foldable tricycle having a seat, the seat having a seat bottom and a seat back, the seat bottom being secured to the frame, and the seat back being pivotally connected to the frame, wherein the release member is connected to the seat back.

The disclosed technology further relates to a foldable tricycle having a head tube housing adjacent the first end of the main frame, and a stem extending from the fork and supporting a handlebar, wherein a portion of the head tube housing is slidingly connected to the stem, and wherein the tricycle can be manipulated between the use position and the folded position by sliding a portion of the head tube axially about the step toward the handlebar.

The disclosed technology further relates to a foldable tricycle wherein the head tube housing comprises an upper head tube housing and a lower head tube housing, wherein the upper head tube housing is slidingly connected to the stem, and wherein the frame can be repositioned from a use position to a folded position by sliding the upper head tube housing toward the handlebar.

The disclosed technology further relates to a foldable tricycle wherein the receiver further has a second receiving position, the release member securing the back of the seat in a folded position almost parallel to the bottom of the seat when the release member is secured in the second receiving position of the receiver.

The disclosed technology further relates to a foldable tricycle wherein the first release mechanism an the second release mechanism both must be actuated to transition the tricycle to the folded position.

The disclosed technology further relates to a foldable tricycle having a stem extending from the fork and supporting a handlebar, and a head tube housing adjacent the first end of the main frame, wherein a portion of the head tube housing is slidingly connected to the stem, and wherein the tricycle can be manipulated between a use position and a folded position by sliding a portion of the head tube toward the handlebar.

The disclosed technology further relates to a foldable tricycle having a fork rotatedly supporting the front wheel, a stem extending from the fork and supporting a handlebar, and a head tube housing adjacent the first end of the main frame, wherein a portion of the head tube housing is slidingly connected to the stem, and wherein the tricycle can be manipulated between the use position and the folded position by sliding a portion of the head tube toward the handlebar.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

Figure 1:
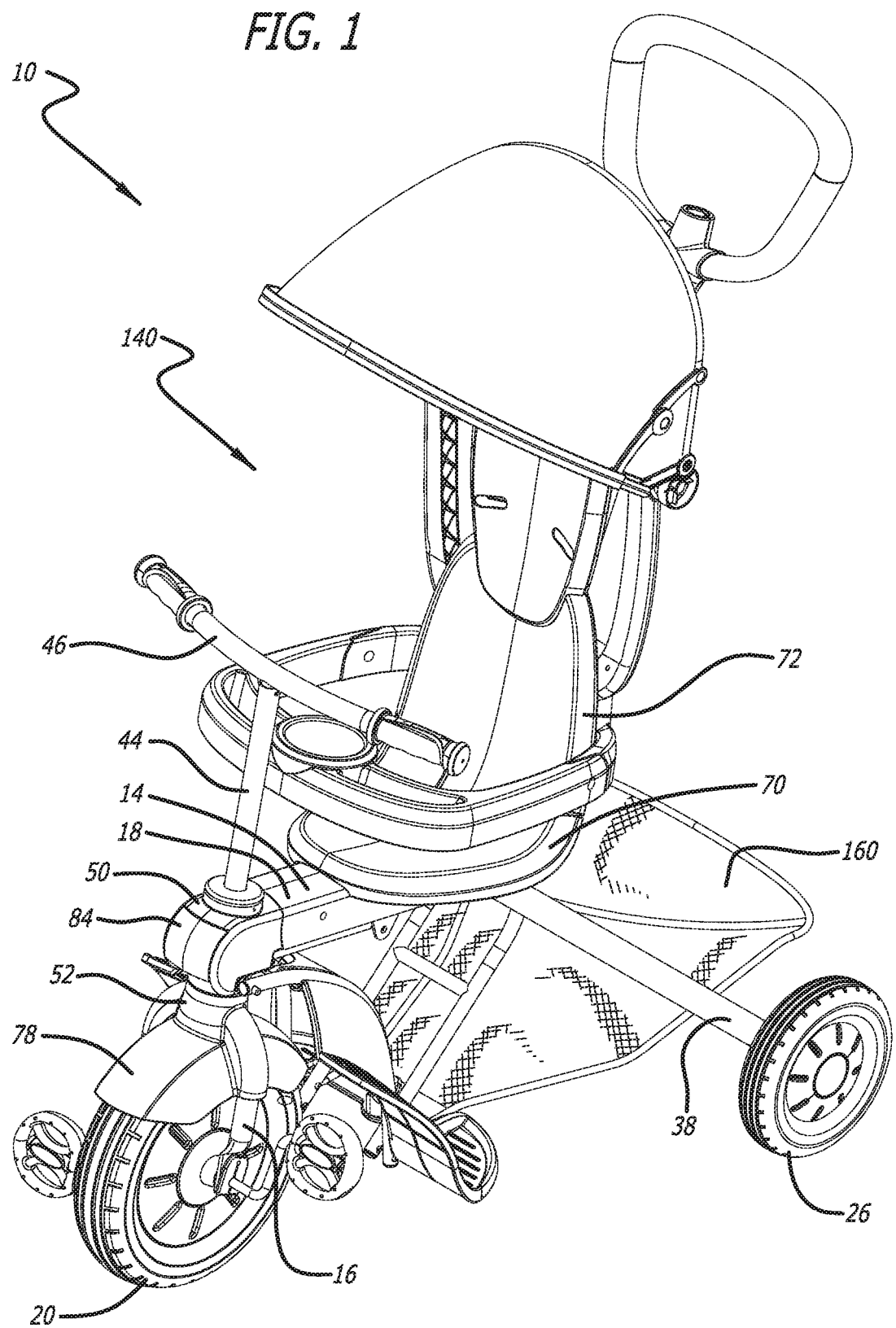
FIG. 1 is a top front perspective view of a foldable tricycle according to one embodiment, illustrated in an unfolded or use configuration.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While the foldable tricycle discussed herein is susceptible of embodiments in many different forms, there is shown in the drawings, and will herein be described in detail, preferred embodiments with the understanding that the present description is to be considered as an exemplification of the principles of the wagon with foldable seats and is not intended to limit the broad aspects of the disclosure to the embodiments illustrated. Thus, the detailed description set forth below is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The foldable tricycle is a product that can be used by children from the infant stage through the toddler stage and into the adolescent stage and beyond. For example, the foldable tricycle can operate as a traditional stroller with a safety harness (i.e., a five point seat belt), an infant stroller support hoop, a sun canopy and a handle for the parent to push and steer the stroller. Further, as the child grows the safety harness, infant support hoop and sun canopy can be removed, independently as desired by the user, such that the tricycle operates as an infant push tricycle. In the push tricycle stage the foldable tricycle can be used as a traditional tricycle by the child, but it also has foot supports if the child gets tired of pedaling, whereby the child can rest his or her feet on the foot supports and the parent can use the parent push or steer handle to push and/or steer the tricycle. Finally, when the child no longer needs the parent steer handle and/or the foot supports, they can likewise be independently removed for use as a traditional tricycle. Moreover, in each of these configurations the tricycle is fully foldable for transportation/storage without removing any accessory. As such, the tricycle converts from a use position to a folded or storage position. Further, in the storage position the tricycle will stand vertically on its own via the built-in stand.

Referring now to the figures, and initially to FIGS. 1-5, in one embodiment the foldable tricycle 10 includes a main frame 14, a front fork 16 adjacent a forward or first end 18 of the frame 14, a front wheel 20 supporting the front fork 16, and first and second rear wheels 26, 30 supporting a rearward or second portion or end 34 of the main frame 14. In a preferred embodiment, the first rear wheel 26 is rotatably supported at a distal end of a first leg 38 that is connected to the frame 14, and the second rear wheel 30 is rotatably supported at a distal end of a second leg 42 that is connected to the frame 14. In one embodiment the first and second legs 38, 42 are integral with the frame 14, and in an alternate embodiment the first and second legs 38, 42 are removably connected to the frame 14. A brake assembly (not shown) may be provided on one or both of the first and second rear wheels 26, 30. The brake assemblies are typically used in the stroller configuration, however, they may be used in the tricycle configuration as well.

The tricycle 10 also has a handlebar stem 44 that extends upwardly from the front fork 16, with a handlebar 46 provided at the top end of the stem 44 opposite the front fork 16. In one embodiment, the tricycle 10 has a head tube housing 48 comprising an upper head tube housing 50 and a lower head tube housing 52. The upper head tube housing 50 is slidingly connected to the stem 44, whereas the lower head tube housing 52 is vertically fixed with respect to the stem 44. A release mechanism 54 releasably connects the upper head tube housing 50 to the lower head tube housing 52. The upper head tube housing 50 also has an extension 56 to pivotally connect the main frame 14 to the upper head tube housing 50.

The tricycle 10 may also have a parent steer assembly 58 to allow a parent pushing the tricycle 10 to steer the front fork 16.

Figure 2:
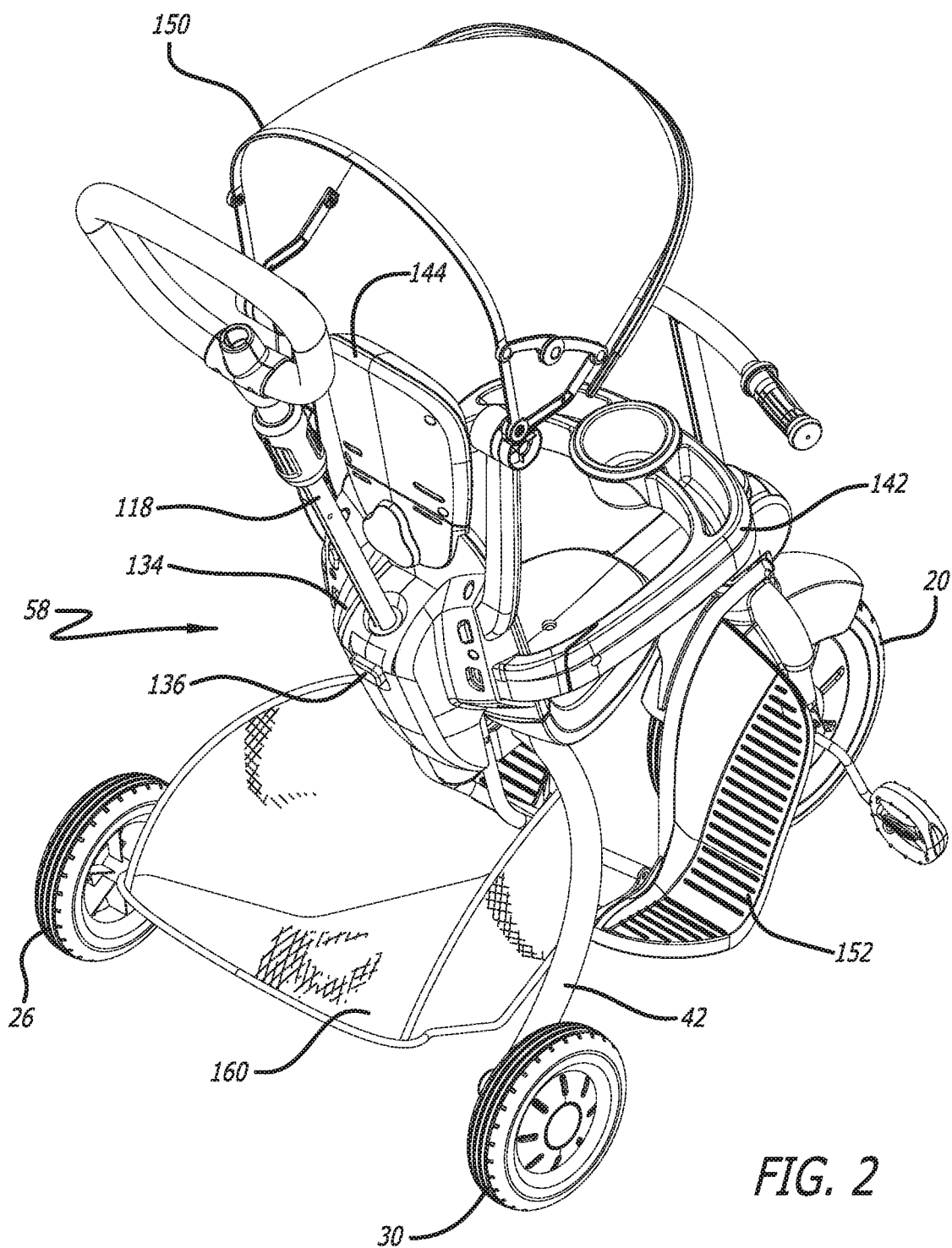
FIG. 2 is a top rear perspective view of the foldable tricycle of FIG. 1.
Figure 3:
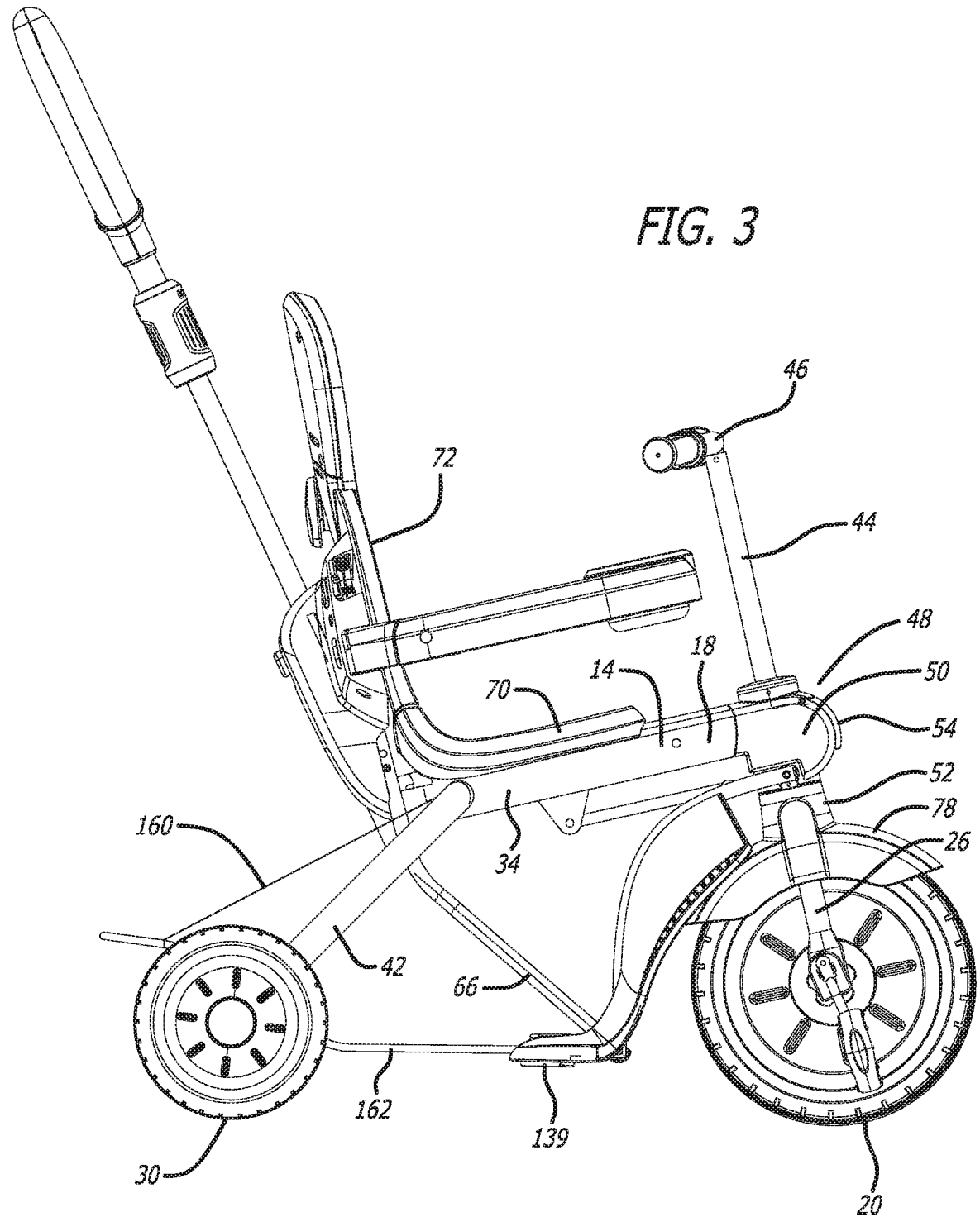
FIG. 3 is a side elevation view of the foldable tricycle of FIG. 1.
Figure 4:
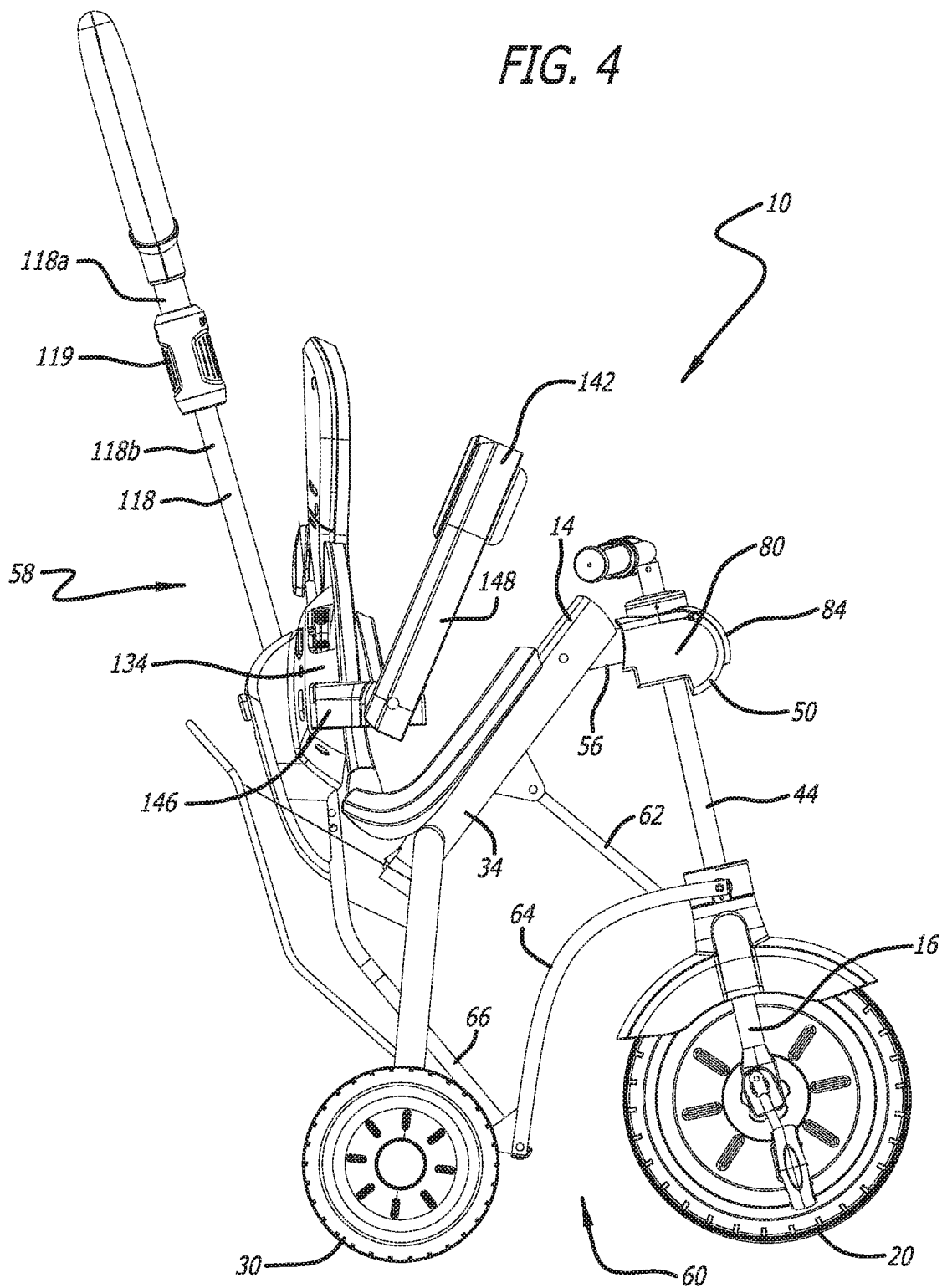
FIG. 4 is a side elevation view of the foldable tricycle of FIG. 1 in the partially folded configuration.
Figure 5:
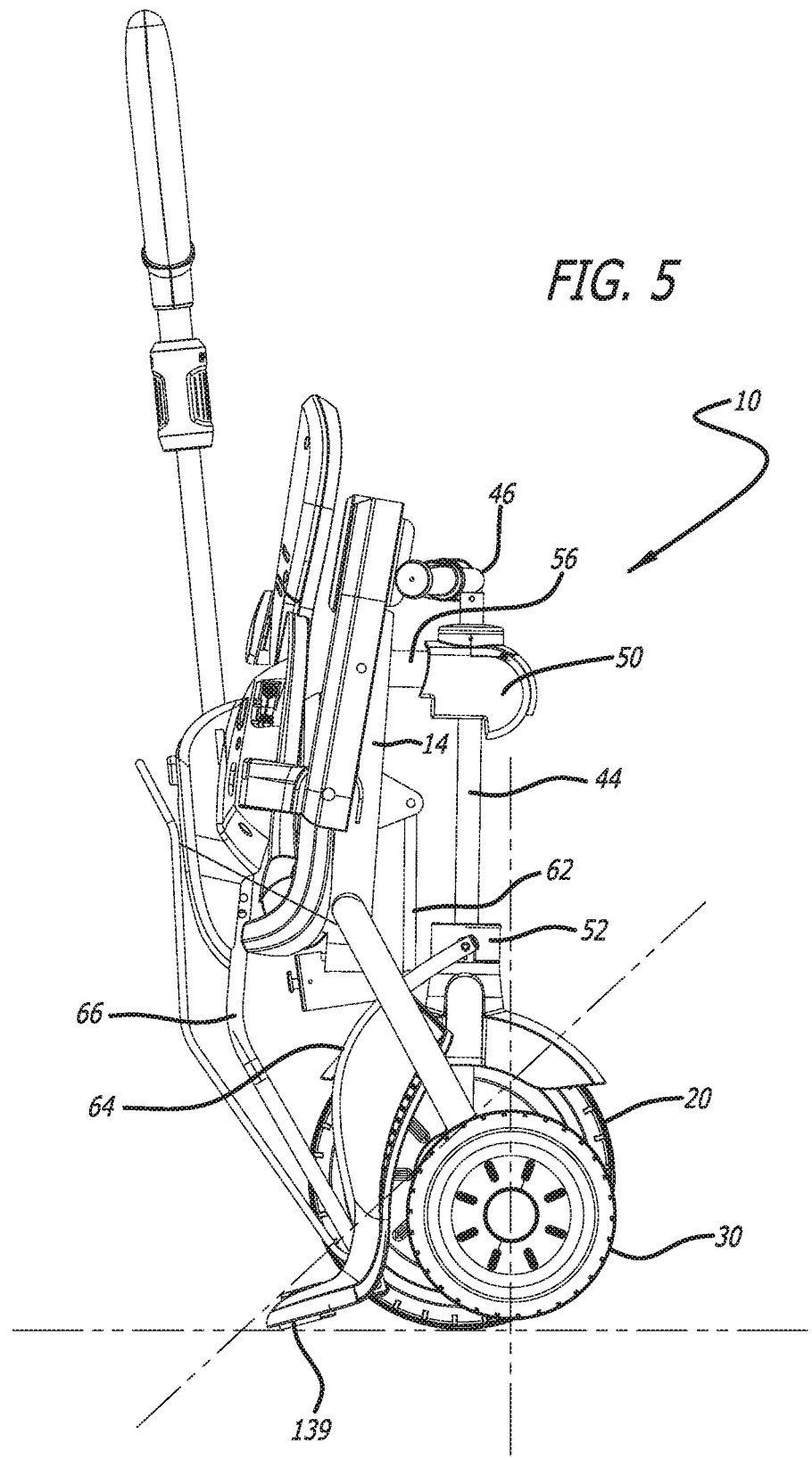
FIG. 5 is a side elevation view of the foldable tricycle of FIG. 1 in the fully folded configuration.
Figure 7:
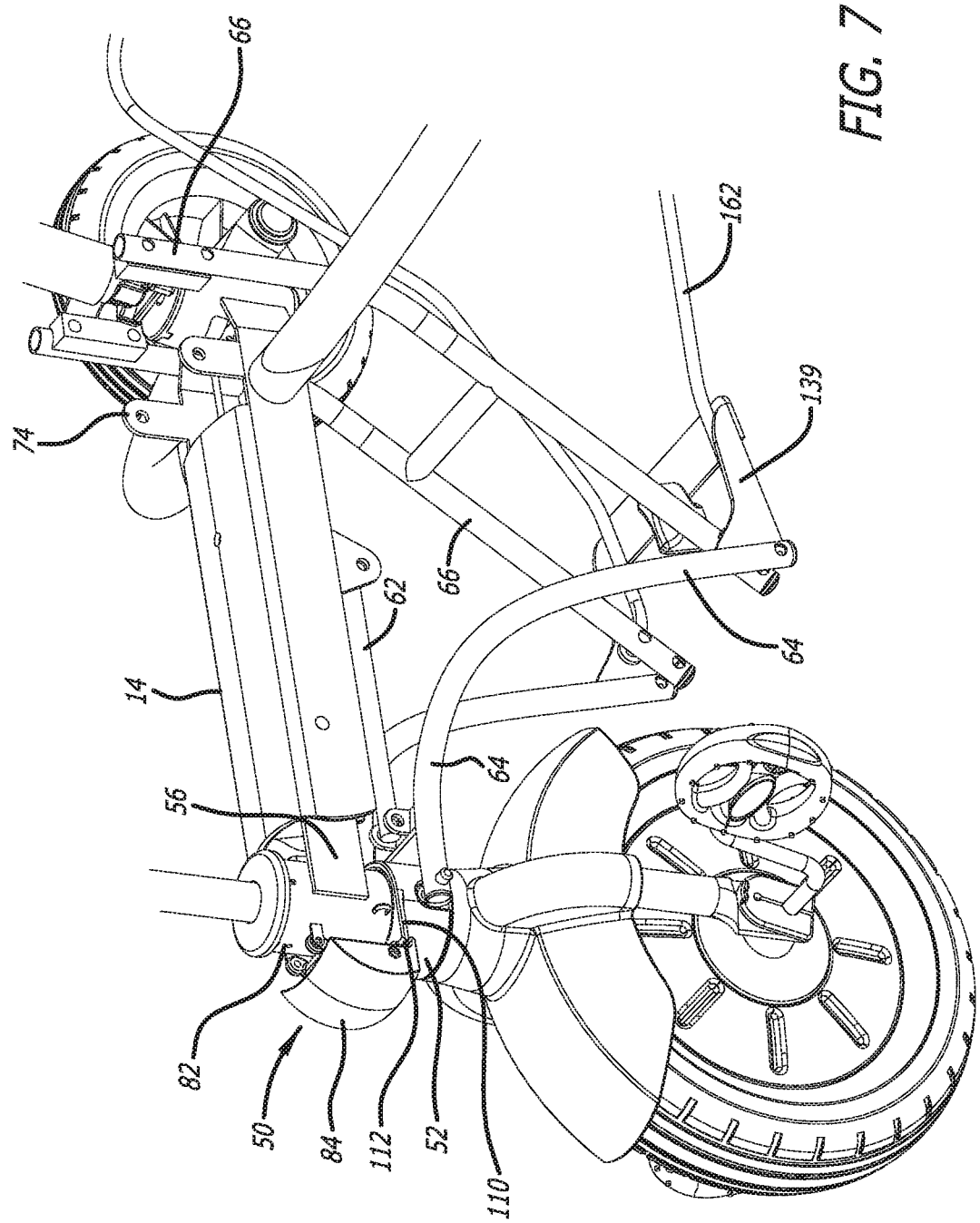
FIG. 7 is a partial top front perspective view of the frame components of the foldable tricycle of FIG. 1.

In one embodiment, the tricycle 10 has a folding mechanism 60 to allow the tricycle 10 to transition from a use configuration, as shown in FIGS. 1-3, to a folded configuration, as shown in FIGS. 4 and 5. As explained herein, in one embodiment the folding mechanism 60 comprises multiple linkage mechanisms working in combination with the sliding upper head tube housing 50 to allow the forward end 18 of the frame 14 to be raised while the rear wheels 26, 30 are pivoted toward the front fork 16 (see FIGS. 4 and 5). These components generally comprise the overall tricycle frame as well. Referring to FIGS. 4, 5 and 7, in one embodiment the multiple linkages comprise the handlebar stem 44, the sliding upper head tube housing 50, the extension 56, the frame 14, the link rod 62, the front linkage 64, the rear linkage 66 and a portion of the seat backplate 68. Such a linkage mechanism may be referred to as a 6 bar linkage with a slider, where the first linkage is the frame 14, the second linkage is the rear linkage 66, the third linkage is the front linkage 64, the fourth linkage is the handle bar stem 44, the fifth linkage is the upper head tube housing 50 and extension 56, and the sixth linkage is the link rod 62. The slider structure of this linkage assembly is the sliding of the upper head tube housing 50 on the stem 44.

In one embodiment, the tricycle 10 also has a bottom seat portion 70 fixedly connected to the rear portion 34 of the main frame 14, and a back seat portion 72 fixedly connected to the seat backplate 68. However, the seat backplate 68 is pivotally connected to the main frame 14 at the tabs 74 extending from the main frame 14 as shown in FIG. 7. Additionally, the seat backplate 68 is fixedly connected to the rear linkage 66. Accordingly, in the use position the back seat portion 72 is generally perpendicular to the bottom seat portion 70 (see FIG. 3), however in the folded configuration the back seat portion 72 is generally parallel to the bottom seat portion 70 (see FIG. 5) due to the folding of the main frame 14.

Referring to FIGS. 3-6, the head tube housing 48 comprises an upper head tube housing 50 and a lower head tube housing 52. In one embodiment the upper head tube housing 50 can become separated from the lower head tube housing 52 and slid vertically upwardly on the stem 44 to collapse or fold the tricycle 10. The lower head tube housing 52, however, remains in place adjacent the fender 78 of the tricycle 10.

In one embodiment, the upper head tube housing 50 comprises an outer housing 80, a slider 82, an extension 56 extending from the slider 82 to pivotally engage the main frame 14, and a lever 84 pivotally connected to the slider 82 and biased by a torsion spring to be retained against the lower head tube housing 52 to maintain the upper head tube housing 50 connected to the lower head tube housing 52 during use of the tricycle 10. The slider 82 has a bore 86 there through in which the handlebar stem 44 resides. Additionally, inside the bore 86 resides a head tube top bushing 88, a head tube bottom bushing 90, and a steering flange 92 that is sandwiched between the top bushing 88 and the bottom bushing 90. The steering flange 92 has ears 94 to connect to the two forward steering rods 96 of the parent steer assembly. The steering flange 92 also has an inwardly facing protrusion 98 to engage the vertical indentation 99 in the handlebar stem 44 so that as the steering flange 92 is manipulated by the steering rods 96 the steering flange 92 can rotate the handlebar stem 44 to steer the tricycle 10. The upper head tube housing 50 also comprises a cover 100 over the assembly.

Figure 6:
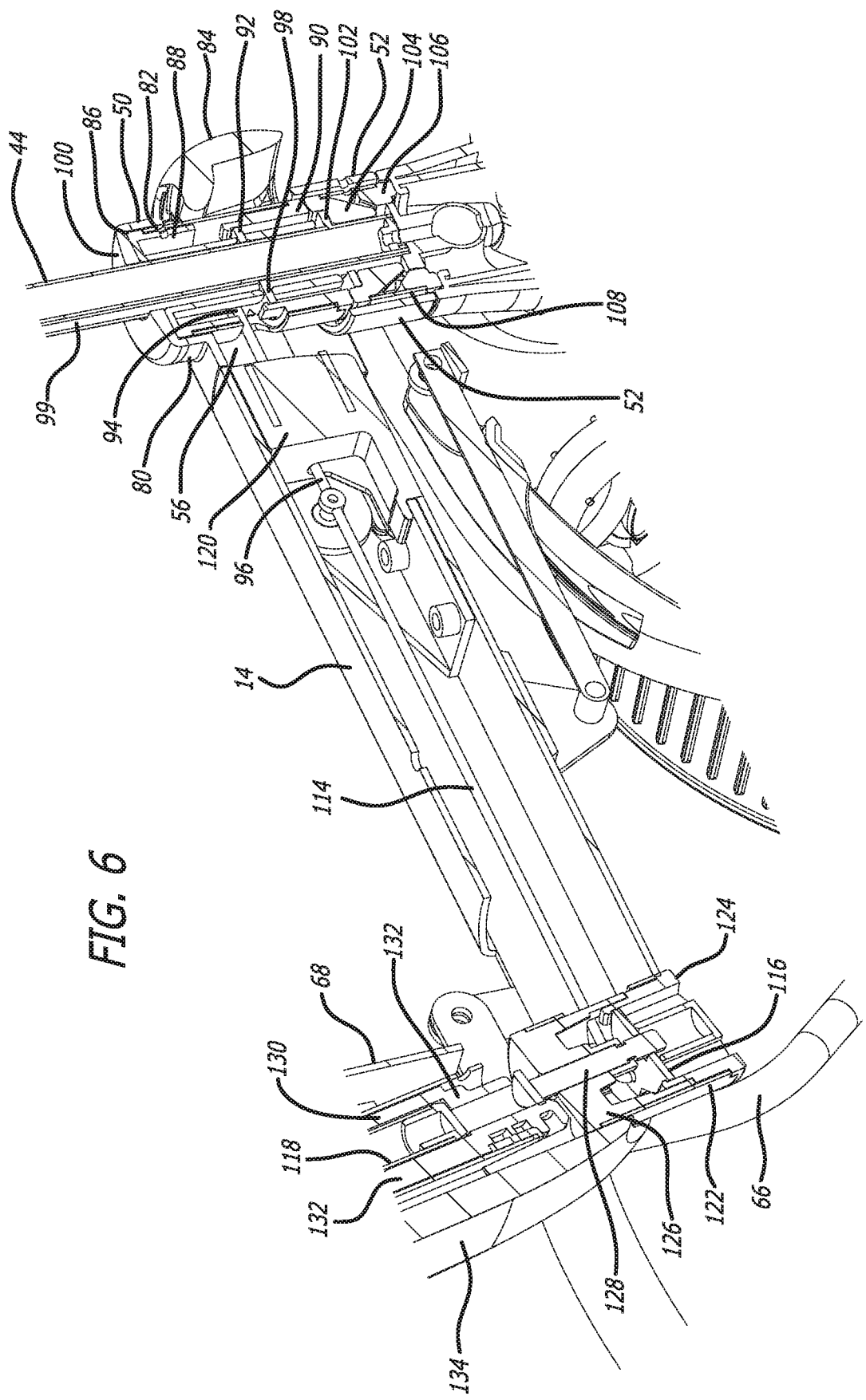
FIG. 6 is a partial side cross-sectional side view of the head tube housing and parent steer connection area for the foldable tricycle of FIG. 1.

As best shown in FIGS. 4, 6 and 7, in one embodiment the lower head tube housing 52 is vertically fixed in place by a flange 102 extending from the stem 44 of the front fork 16, and rotationally secured in place by the front linkage 64. Specifically, inside the lower head tube housing 52 is a top steering bushing 104 and a bottom steering bushing 106. The flange 102 of the stem 44 operates as a top stop for the top steering bushing 104. A stationary head tube 108 is provided around the top and bottom steering bushings 104, 106, and the lower head tube housing 52 is provided around the stationary head tube 108. The lower head tube housing 52 has flanges 110 that are engaged by ears 112 extending from the lever 84 to retain the upper head tube housing 50 fixed to the lower head tube housing 52. These are some components of the release mechanism 54.

As explained above, the tricycle 10 also has a parent steer assembly 58 to allow a parent pushing the tricycle 10 to steer the front fork 16. Components of the parent steer assembly 58 are provided in the upper head tube housing 50, the main frame 14, and the housing 122 at the rear end of the main frame 14, and they generally comprise the steering flange 92 connected to the stem 44, the two forward steering rods 96 connected to the steering flange 92, and two rear steering rods 114 connected to a rear steering flange 116 that is operatively driven by the parent steer handle 118. The rear steering rods 114 operate the forward steering rods 96, but they also allow for pivoting between the forward steering rods 96 and the rear steering rods 114 during folding of the tricycle 10. The rear steering rods 114 and the forward steering rods 96 reside within the interior of the main frame 14. The forward steering rods 96 are maintained in proper location with a slotted front pinch cover 120 at the forward end 18 of the main frame 14. A first end of the rear steering rod is operably connected to the parent steer handle, and a first end of the forward steering rod operably connected to the fork. A second end of the rear steering rod is pivotally connected to a second end of the forward steering rod to provide for steering capabilities in a folding tricycle.

A portion of the rear component of the parent steer assembly 58 is supported by a housing 122 connected to the main frame 14. The housing 122 supports a lower bushing 124 and an upper bushing 126, which sandwich the rear steering flange 116. As explained above, the rear steering rods 114 are connected to the rear steering flange 116. And, the rear steering flange 116 is driven by a drive shaft 128 that is operatively driven by the removable parent steer handle 118.

Another portion of the rear component of the parent steer assembly 58 is supported by the seat backplate 68 that is connected to the rear linkage 66. Specifically, the seat backplate 68 has a cavity 130 that houses bushings 132 that removably and rotatably receive the parent steer handle 118. The parent steer handle 118 drives the lower bushing 132, which in turn drives the drive shaft 128 in the housing 122 of the main frame 14. A housing 134 covers the rear component of the parent steer assembly 58 that is supported by the seat backplate 68. The housing 134 also contains a pushbutton release member 136 to release the parent steer handle 118 from the rear component of the parent steer assembly 58.

The parent steer handle 118 can be used by a parent to steer the tricycle 10, especially in the stroller mode for use with a young child. In one embodiment, the parent steer handle 118 is able to still be connected to the tricycle 10 during folding of the tricycle 10 (see FIGS. 4 and 5), however, in an alternate embodiment the parent steer handle 118 can be removed from the tricycle 10 for use and/or folding. In another embodiment, the length of the parent steer handle 118 can be made adjustable, for example by providing an upper shaft 118a, a lower shaft 118b, and a coupling assembly 119 between the upper and lower shafts.

Referring to overall frame of the tricycle, in one embodiment the front portion 18 of the frame 14 is pivotally attached to the extension 56 of the upper head tube housing 50, and the upper head tube housing 50 is slidingly connected to the stem 44 of the front fork 16. The link rod 62 is pivotally attached at one end to the bottom of the frame 14, and at the other end is pivotally attached to the front end of the front linkage 64. The front linkage 64 is pivotally attached at its front end to the lower head tube housing 52. The rear end of the front linkage 64 is pivotally connected to the bottom of the rear linkage 66. Additionally, a stand 139 is provided at the lower end of the front linkage 64. The stand 139 maintains the tricycle 10 standing upright as shown in FIG. 5 when the tricycle 10 is in the closed position. The top of the rear linkage 66 is fixedly connected to the seat backplate 68, and the seat backplate 68 is pivotally attached to tabs extending from a top of the frame 14.

As further shown in FIGS. 1-5, in one embodiment an optional infant restraint assembly 140 is removably coupled to the rear seat back housing 134 or the back seat portion 72. The restraint assembly 140 may include one or more of a restraining hoop 142, preferably removably coupled to the rear seat back housing 134, a head rest 144, preferably removably coupled to the seat back 72, and a safety harness (not shown). As shown in FIGS. 4 and 5, the restraining hoop 142 has fixed arms 146 that are removably coupled to the rear seat back housing 134 and a pivotable front portion 148 connected to the fixed arms 146. In this configuration, as the tricycle 10 is transitioned to the folded configuration the front portion 148 of the restraining hoop 142 will pivot upwardly to allow the main frame 14 to slide upwardly on the stem 44. In another embodiment the restraint hoop may have a first hinge and a second hinge, wherein the restraint hoop automatically pivots about the first and second hinges to a folded position during the transition of the tricycle from the use position to the folded position. The tricycle 10 may also include a canopy assembly 150 that may be removably coupled to the rear seat back housing 134. The canopy assembly 150 is preferably pivotable and extendable to a variety of positions to shield a child seated on the tricycle 10 from the sun.

Figure 8:
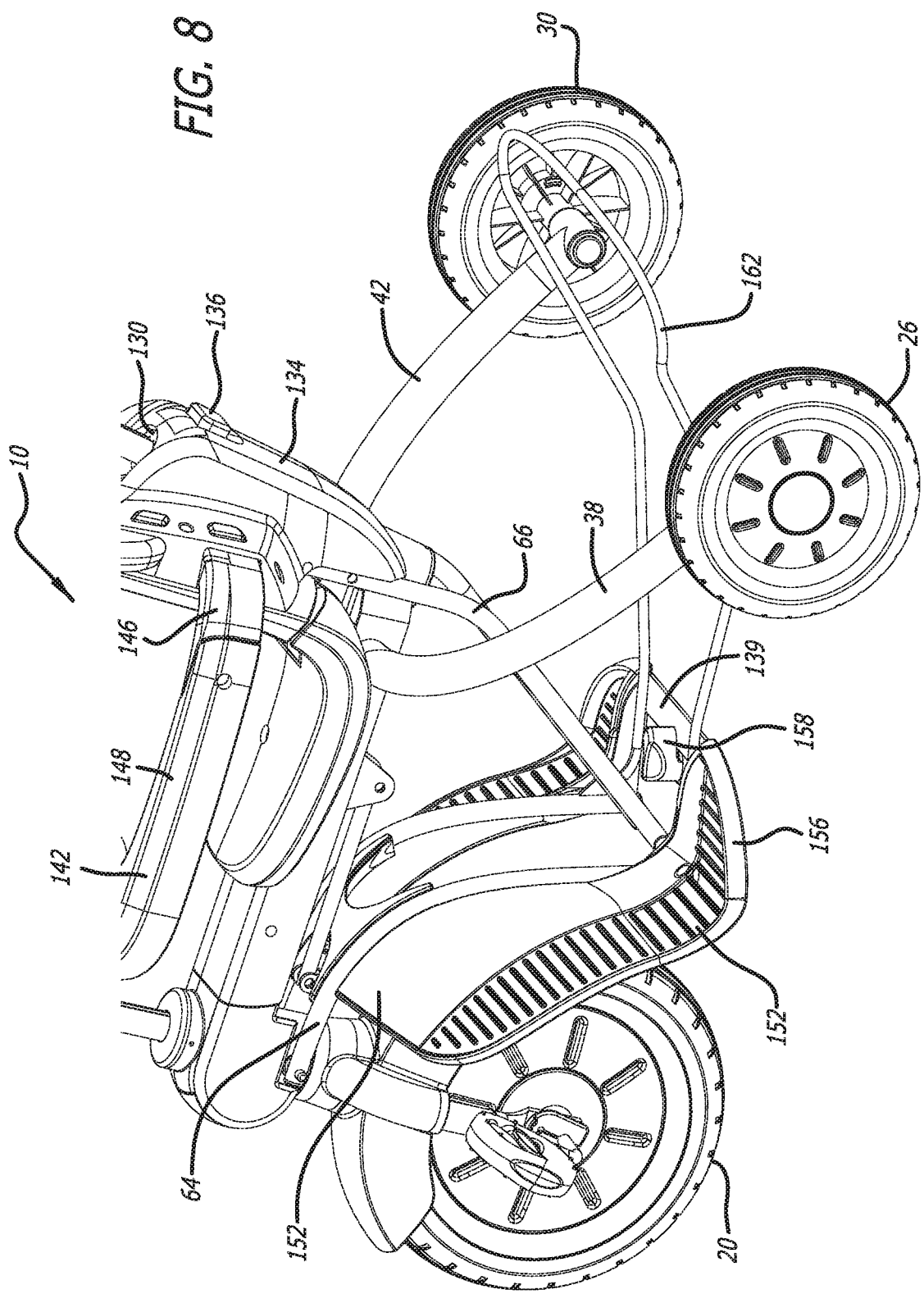
FIG. 8 is a partial top rear perspective view of the foldable tricycle of FIG. 1.
Figure 9:
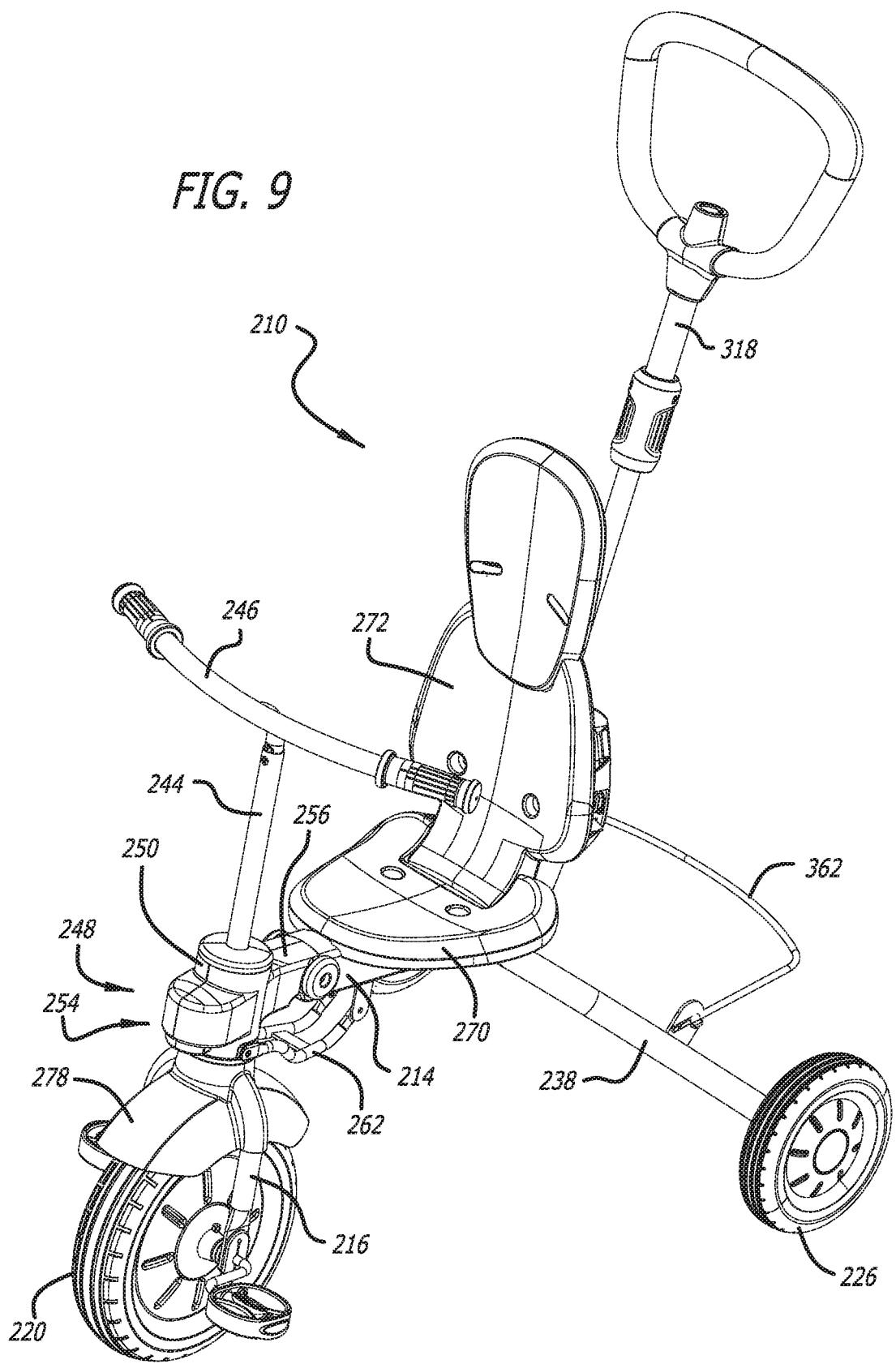
FIG. 9 is a top front perspective view of a foldable tricycle according to another embodiment, illustrated in an unfolded or use configuration.
Figure 10:
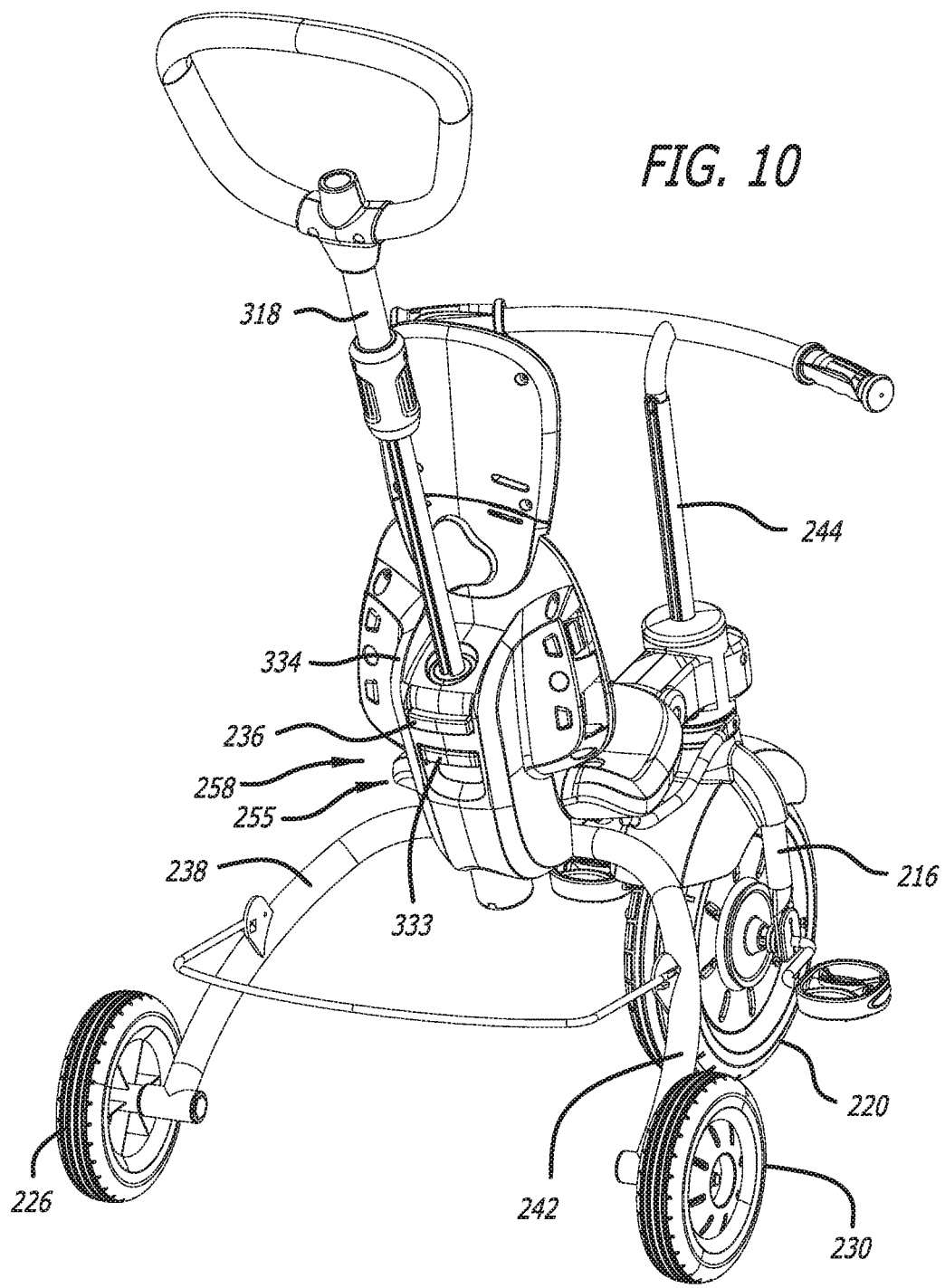
FIG. 10 is a top rear perspective view of the foldable tricycle of FIG. 9.
Figure 11:
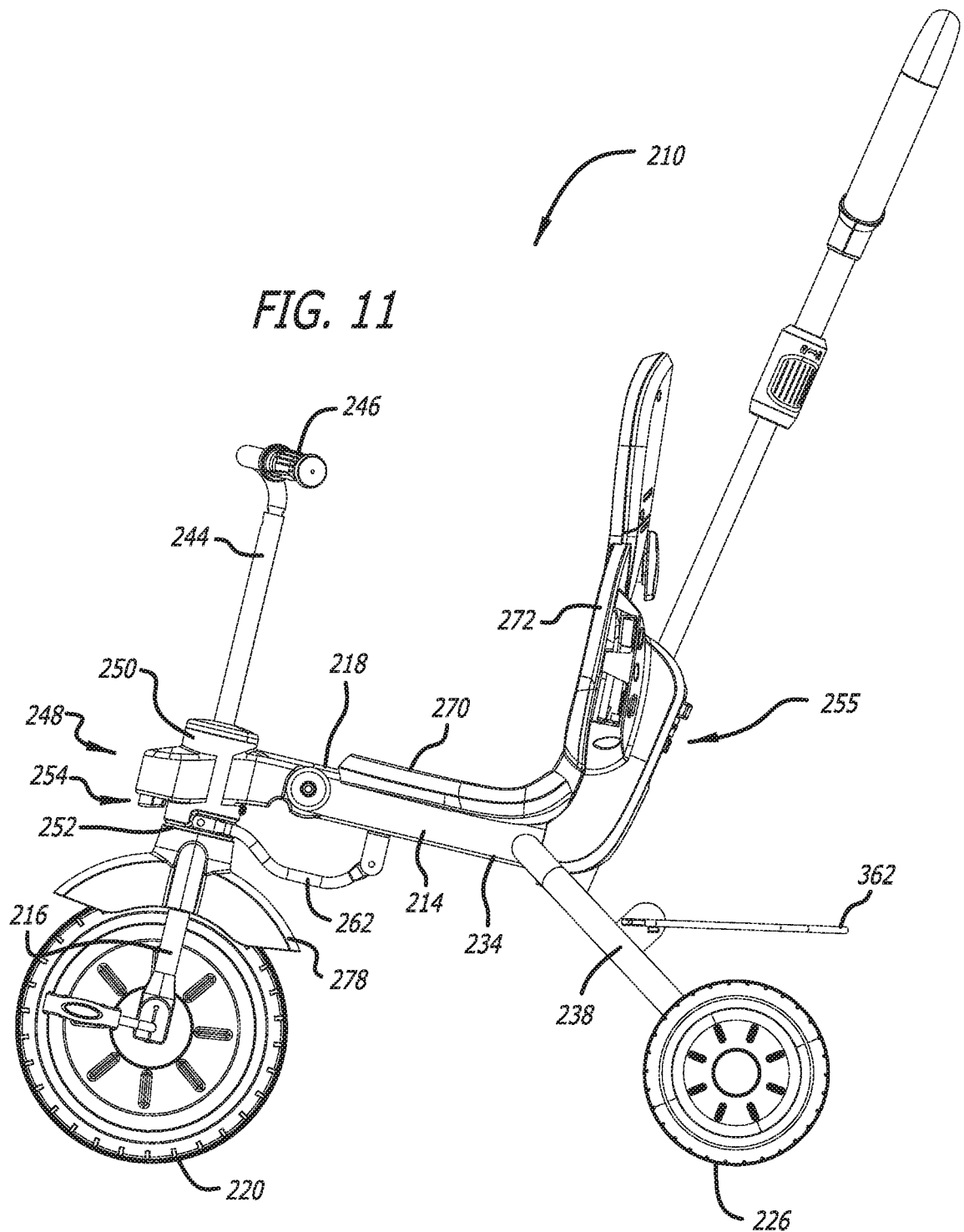
FIG. 11 is a side elevation view of the foldable tricycle of FIG. 9.

Referring to FIGS. 1, 2 and 8, the tricycle 10 also preferably has a removable footrest 152 for the child. In one embodiment the footrest 152 has a first end 154 that is secured over a crossbar of the front linkage 64. The second end 156 of the footrest 152 is preferably split, and the two sides are connected together with a knob 158 to the stand 139 at the lower end of the front linkage 64. Accordingly, the footrest 152 can be removed by releasing the knob 158 to split the two halves of the second end 156 of the footrest 152, thereby disconnecting the second end 156 of the footrest 152 from the stand 139. The first end 154 of the footrest 152 can then be disconnected from the crossbar at the front of the front linkage 64 and the entire footrest 152 can be removed. The footrest 152 is typically removed when the child is able to pedal the tricycle 10 on his or her own.

In one embodiment, the tricycle 10 may also have a container 160, such as a bag or other storage device that is secured via a frame 162 between the first and second legs 38, 42 for storing items. For example, in one embodiment as shown in FIG. 8, a container frame 162 is secured to one of either the lower end of the front linkage 64 or to the stand 139. Further, in an alternate embodiment the container frame 162 is pivotally secured to the tricycle 10 so that as the tricycle 10 is folded the container frame 162 can rotate with the moving components. The container 160 is preferably secured to both the container frame 162, at the bottom of the container 160, and to some other portion of the tricycle 10 at the top portion of the container 160, such as the seat backplate 68. Accordingly, in one embodiment when the frame of the tricycle begins to rotate during folding of the frame, the connection of the container 160 to the seat backplate 68, or some other portion of the tricycle frame, will cause the container frame 162 to rotate therewith. The container 160 or storage device may be formed of a combination of fabric, foam, plastic, and/or other materials.

To fold the tricycle 10, the first step is to pivotally lift the lever 84 of the upper head tube housing 50. When the lever 84 is pivoted outwardly, the upper head tube housing 50 becomes disassociated from the fixed lower head tube housing 52. The upper head tube housing 50 can be lifted and slid upwardly on the handlebar stem 44. As the upper head tube housing 50 is slid upwardly on the handlebar stem 44, as shown in FIG. 4, the front end 18 of the frame 18 will also be raised and will pivot at its pivoting connection with the extension 56 of the upper head tube housing 50. The pivoting connections of the various components of the previously described sliding linkage mechanism will cause the rear wheels to fold inwardly toward the front wheel of the tricycle as the upper head tube housing 50 is raised as shown in FIG. 4. In one embodiment, to fully fold the tricycle 10 the rear section of the tricycle is pushed toward the front wheel to transition the tricycle from the partially folded orientation shown in FIG. 4 to the fully folded orientation shown in FIG. 5. In one embodiment the link rod 62 operates as an over-center linkage so that the tricycle 10 will be somewhat restrained in the folded configuration until a sufficient force is provided to overcome the over center force to return the tricycle 10 to the unfolded or open configuration. Additionally, in the folded configuration the stand 139 will contact the ground, along with the front wheel, to operate to maintain the tricycle in the upright or standing orientation.

Another embodiment of the foldable tricycle is shown in FIGS. 9-22. In this embodiment, the foldable tricycle 210 includes a main frame 214, a front fork 216 adjacent a forward or first end 218 of the frame 214, a front wheel 220 rotatedly supporting the front fork 216, and first and second rear wheels 226, 230 supporting a rearward or second portion or end 234 of the main frame 214. In a preferred embodiment, the first rear wheel 226 is rotatably supported at a distal end of a first leg 238 that is connected to the frame 214, and the second rear wheel 230 is rotatably supported at a distal end of a second leg 242 that is connected to the frame 214.

The tricycle 210 also has a handlebar stem 244 that extends upwardly from the front fork 216, with a handlebar 246 provided at the top end of the stem 244 opposite the front fork 216. In one embodiment, the tricycle 210 has a head tube housing 248 comprising an upper head tube housing 250 and a lower head tube housing 252. The upper head tube housing 250 is axially slidingly connected to the stem 244, whereas the lower head tube housing 252 is vertically or axially fixed with respect to the stem 244. A first release mechanism 254 releasably connects the upper head tube housing 250 to the stem 244. The upper head tube housing 250 also has an extension 256 to pivotally connect the main frame 214 to the upper head tube housing 250. In such an embodiment, the overall frame can be said to be a pivotal frame that comprises both the main frame 214 and the upper head tube housing 250. And, the frame can be repositioned from a use position to a folded position by sliding the upper head tube housing on the stem toward the handlebar.

As shown in FIGS. 11-19, the tricycle 210 has a folding mechanism 260 to allow the tricycle 210 to transition from a use configuration, as shown in FIGS. 9-11 and 17-18, to a folded configuration, as shown in FIGS. 12-13 and 19-20. As explained herein, in one embodiment the folding mechanism 260 comprises multiple linkage mechanisms working in combination with the sliding upper head tube housing 250 to allow the forward end 218 of the frame 214 to be raised while the rear wheels 226, 230 are pivoted toward the front fork 216 (see FIGS. 11-13). Referring to FIGS. 11-21, in one embodiment the multiple linkages comprise the handlebar stem 244, the sliding upper head tube housing 250, the extension 256, the frame 214, the link rod 262, the rear linkage 266, and a portion of the seat backplate 268. In this linkage and slider mechanism, the first linkage is the frame 214, the second linkage is the rear linkage 266, the third linkage is the handle bar stem 244, the fourth linkage is the upper head tube housing 250 and extension 256, and the fifth linkage is the link rod 262. The slider structure of this linkage assembly is the sliding of the upper head tube housing 250 on the stem 244. In one embodiment the ability for the folding mechanism 260 to be operated is limited by actuation of the first release mechanism 254 and a second release mechanism 255. The first release mechanism 254 is adjacent the first end of the frame and the second release mechanism 255 is adjacent the second end of the frame.

Figure 21:
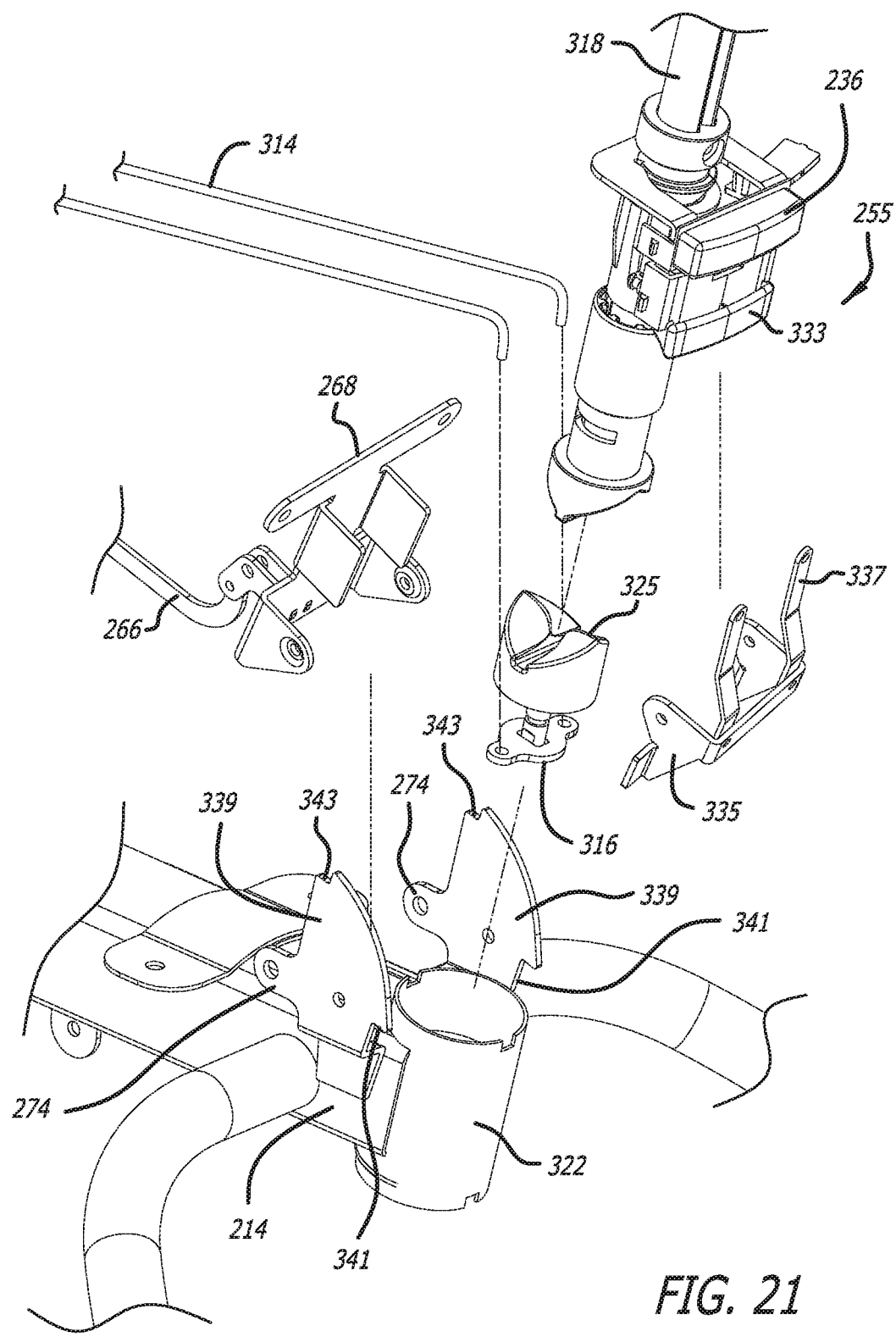
FIG. 21 is an exploded perspective view of the rear release mechanism of the foldable tricycle of FIG. 9.

In one embodiment, the tricycle 210 also has a bottom seat portion 270, also referred to as a seat bottom 270, fixedly connected to the rear portion 234 of the main frame 214, and a back seat portion 272, also referred to as a seat back 272, fixedly connected to the seat backplate 268. However, the seat backplate 268 is pivotally connected to the main frame 214 at the tabs 274 extending from the main frame 214 as shown in FIG. 21. Additionally, the seat backplate 268 is rotatedly connected to the rear linkage 266. Accordingly, in the use position the back seat portion 272 is generally perpendicular to the bottom seat portion 270 (see FIG. 11), however in the folded configuration the back seat portion 172 is generally parallel to the bottom seat portion 170 (see FIG. 13) due to the folding of the upper head tube housing 250 and frame 214, in connection with the various linkages/links.

Referring to FIGS. 13-16 and 22-23, the head tube housing 248 comprises an upper head tube housing 250 and a lower head tube housing 252. In various embodiments the upper head tube housing 250 can become separated from the lower head tube housing 252 and slid vertically upwardly on the stem 244 to collapse or fold the tricycle 210. The lower head tube housing 252, however, remains in place adjacent the fender 278 of the tricycle 210. The head tube housing is adjacent the first end of the frame.

The upper head tube housing 250 may comprise an outer housing 280, a slider 282, an extension 256 extending from the slider 282 to pivotally engage the main frame 214, and a first release mechanism 254. The first release mechanism 254 may comprise a release button 283, a locking plate 285 engageable by the release button 283, and a locking pin 287. In one embodiment the locking plate operates to transition the locking pin from a locked position to an unlocked position to allow the head tube housing to slide axially on the stem. In one embodiment the locking pin 287 is biased to prevent axial sliding or axial movement of the upper head tube housing 250, and thereby maintain the upper head tube housing 250 adjacent the lower head tube housing 252 during use of the tricycle 210, until the locking pin 287 is actuated by the movement of the release button 283. The slider 282 has a bore 286 therethrough in which the handlebar stem 244 resides. Additionally, inside the slider 282 resides a head tube top bushing 288, a head tube bottom bushing 290, and a steering flange 292 that is positioned between the top bushing 288 and the bottom bushing 290. The steering flange 292 has ears 294 to connect to the two forward steering rods 296 of the parent steer assembly. The steering flange 292 also has an inwardly facing protrusion 298 to engage the vertical indentation 299 in the handlebar stem 244 so that as the steering flange 292 is manipulated by the steering rods 296 the steering flange 292 can rotate the handlebar stem 244 to steer the tricycle 210.

Referring to overall frame of the tricycle, in one embodiment the front portion 218 of the frame 214 is pivotally attached to the extension 256 of the upper head tube housing 250, and the upper head tube housing 250 is axially slidingly connected to the stem 244 of the front fork 216. The link rod 262 is pivotally attached at one end to the bottom of the frame 214, and at the other end is pivotally attached to the lower head tube housing 252.

To actuate the first release mechanism 254 the user typically pushes in the release button 283. The release button 283 has a cammed surface 289 that engages the locking plate 285. The interaction of the cammed surface 289 and the locking plate 285 operates to translate motion in one direction of the release button 283 (e.g., vertical motion) into motion of the locking plate 285 in a different direction (e.g., horizontal motion). The locking plate 285 engages the locking pin 287 and pushes the locking pin 287 in sufficiently to prevent the locking pin 287 from restricting movement of the upper head tube housing 250 along the stem 244 The locking pin 287 is biased so that when the upper head tube housing 250 is moved back into its original position during transition of the tricycle 210 from the folded position to the use position the locking pin 287 will automatically engage the upper head tube housing 250 to restrict axial movement of the upper head tube housing 250 until the release button 283 is actuated again by the user.

Figure 14:
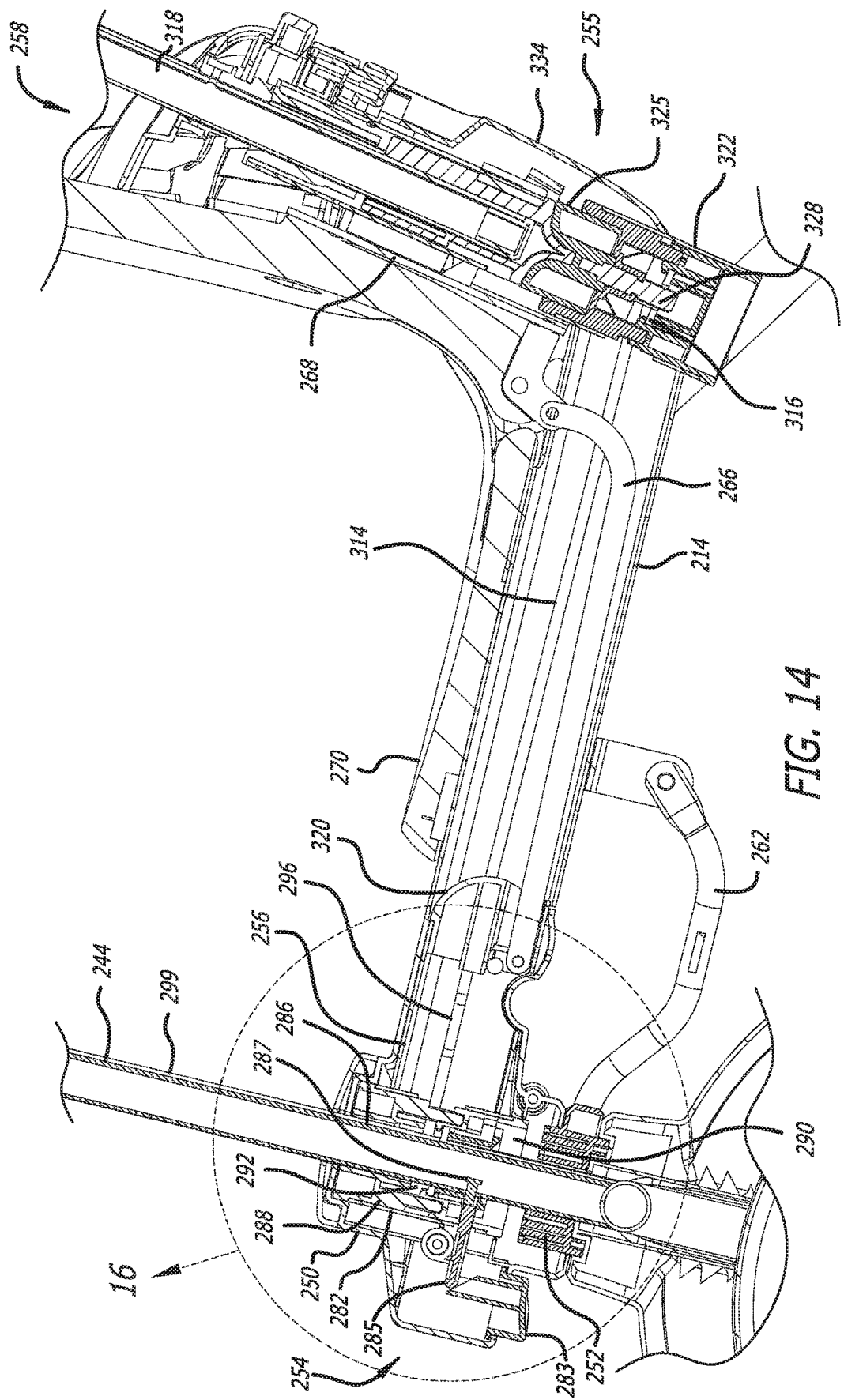
FIG. 14 is a partial side cross-sectional side view of the head tube housing and parent steer connection area for the foldable tricycle of FIG. 9.
Figure 15:
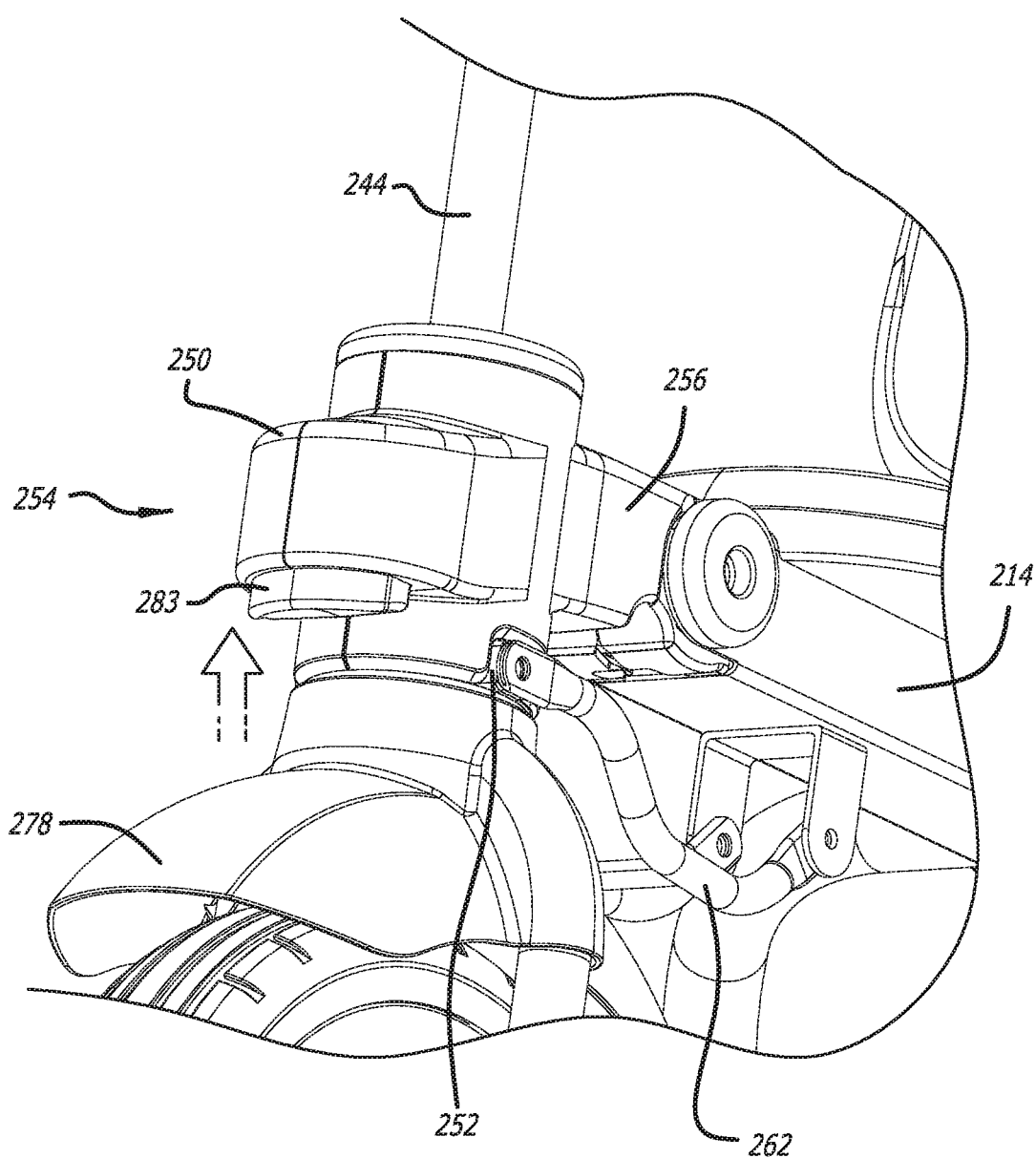
FIG. 15 is a partial top front perspective view of one of the release mechanisms for the foldable tricycle of FIG. 9.
Figure 16:
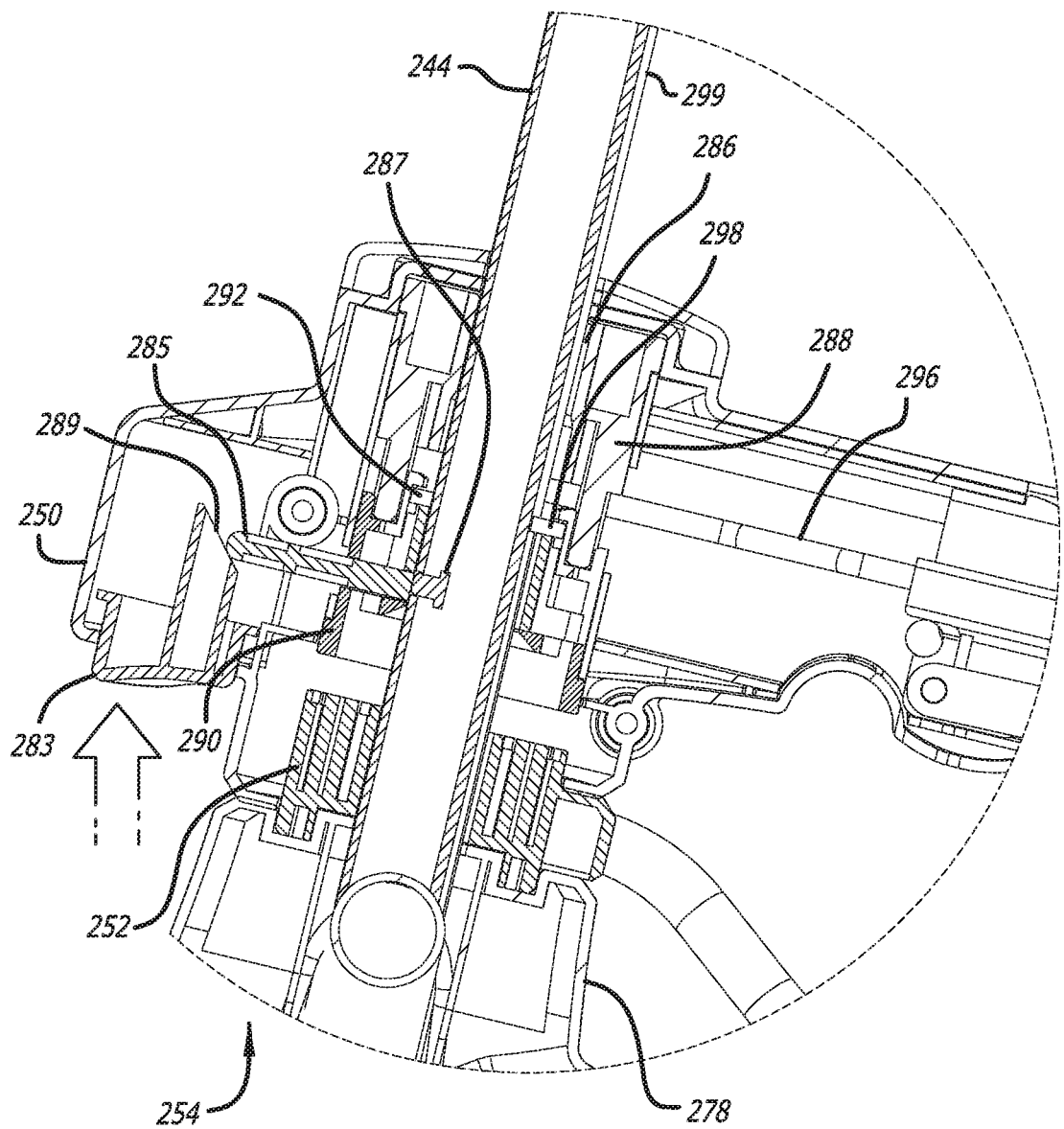
FIG. 16 is a partial cross-sectional view of the front release mechanism shown in FIG. 9.
Figure 19:
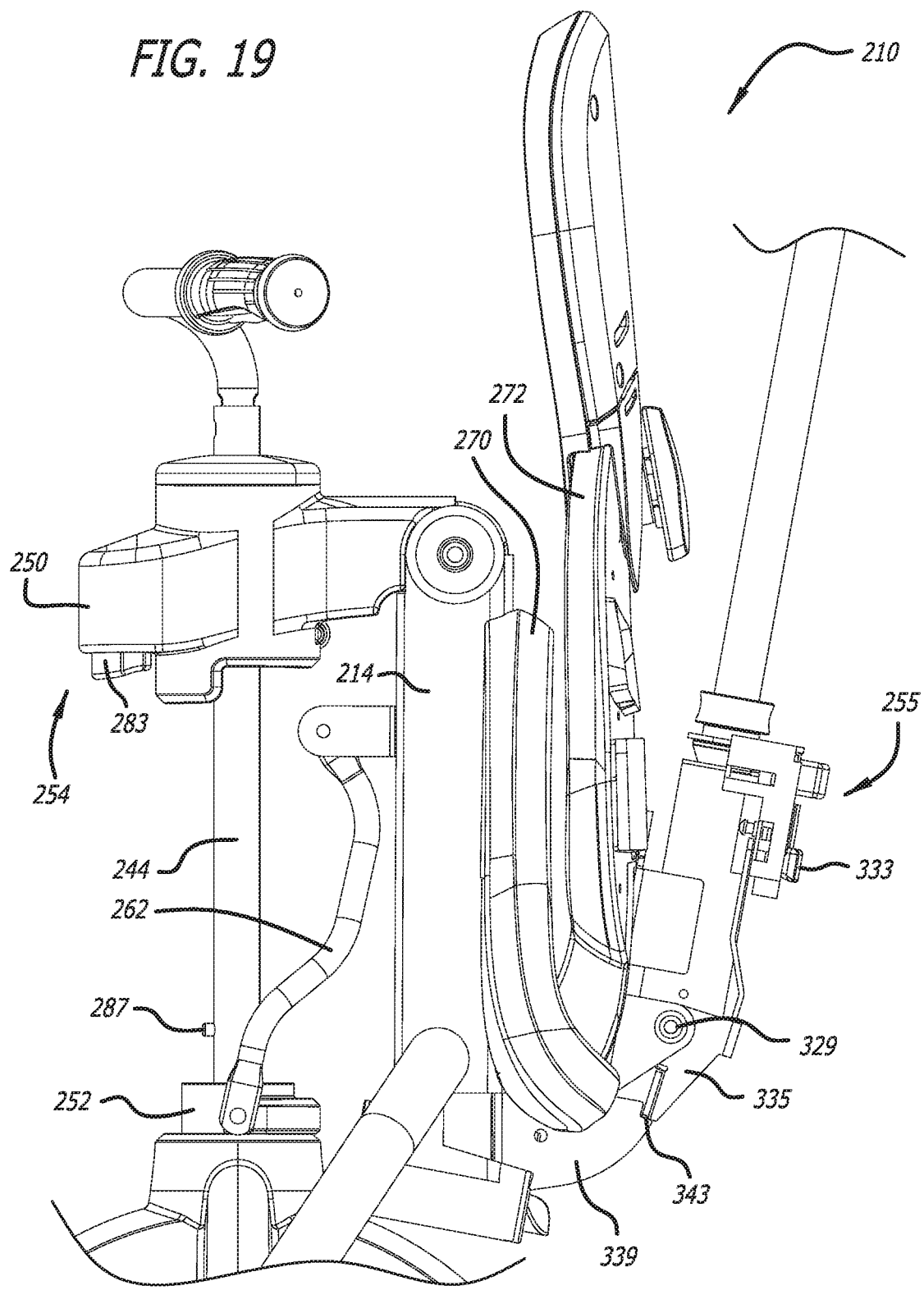
FIG. 19 is a partial side view of the rear release mechanism for the foldable tricycle of FIG. 9, in the locked position when the tricycle is in the folded position.

As best shown in FIGS. 14, 16 and 19, in one embodiment the lower head tube housing 252 is vertically fixed in place by a pin (not shown) or other extension extending from the stem 244 of the front fork 216, on one side, and the fender 278, on the other side, and rotationally secured in place by the link rod 262. In one embodiment the lower head tube housing 252 comprises a steering bushing 304. The steering bushing 304 is engaged by the pin and fender 287, as well as being connected to the link rod 262.

Figure 23:
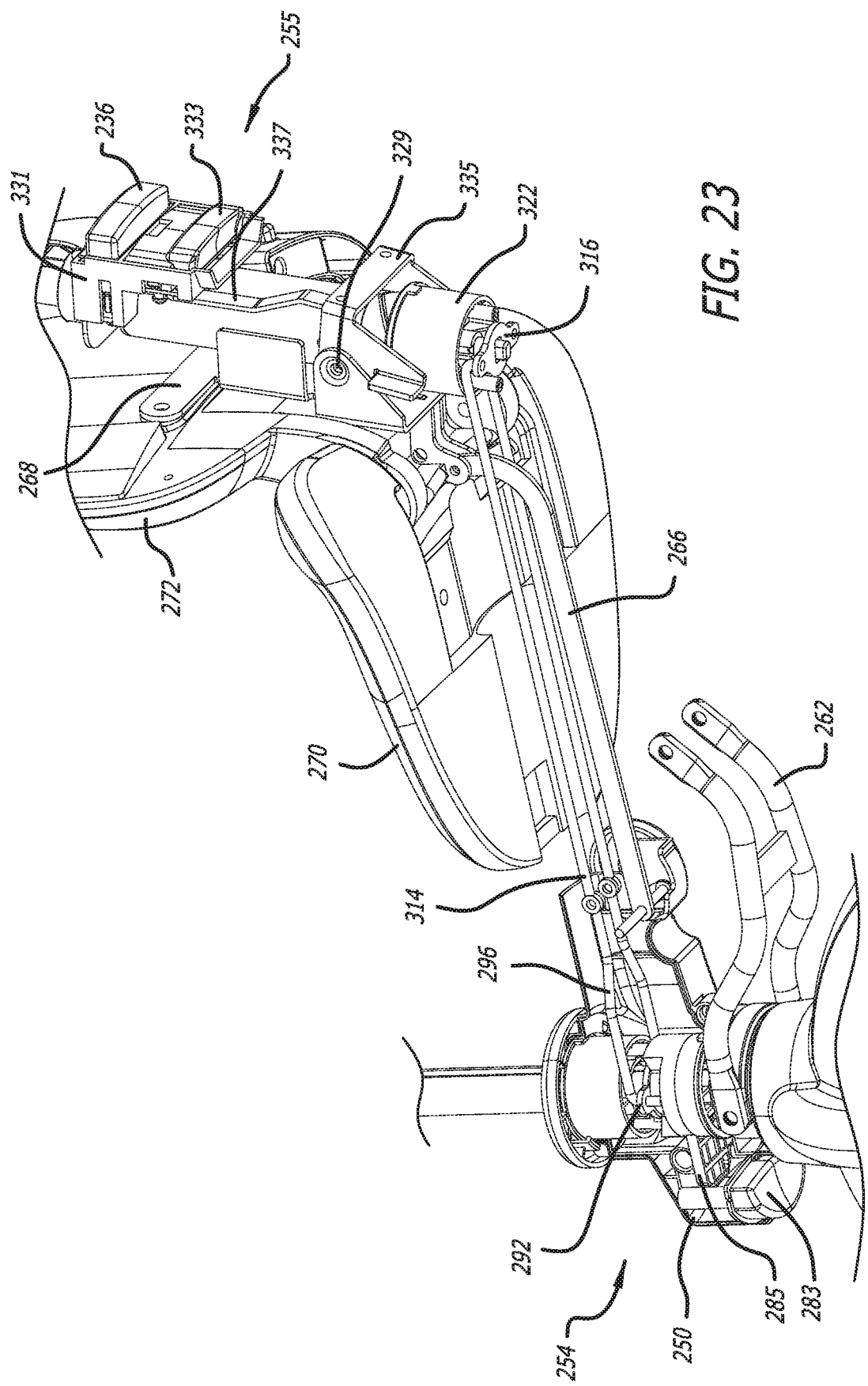
FIG. 23 is a partial rear bottom perspective view of the head tube housing, parent steer connection area and frame components for the foldable tricycle of FIG. 9.

As explained above, the tricycle 210 also has a parent steer assembly 258 to allow a parent pushing the tricycle 210 to steer the front fork 216. Components of the parent steer assembly 258 are provided in the upper head tube housing 250, the main frame 214, the parent steer drive housing 322 at the rear end of the main frame 214, and the overall parent steer housing 334, and they generally comprise the steering flange 292 connected to the stem 244, the two forward steering rods 296 connected to the steering flange 292, two rear steering rods 314 connected to a rear steering flange 316 that is operatively driven by the parent steer handle 318, and the components to secure the parent steer handle 318 to the parent steer assembly 258. The rear steering rods 314 operate the forward steering rods 296. The connection between the rear steering rods 314 and the forward steering rods 296 is a pivoting connection, as shown in FIG. 23, which allows for pivoting between the forward steering rods 296 and the rear steering rods 314 during folding of the tricycle 210. The rear steering rods 314 generally reside within the interior of the main frame 214, and the forward steering rods 296 generally reside in the upper head tube housing 250. The forward steering rods 296 are maintained in proper location with a slotted front pinch cover 320 at the end of the extension 256 adjacent the forward end 218 of the main frame 214.

Figure 22:
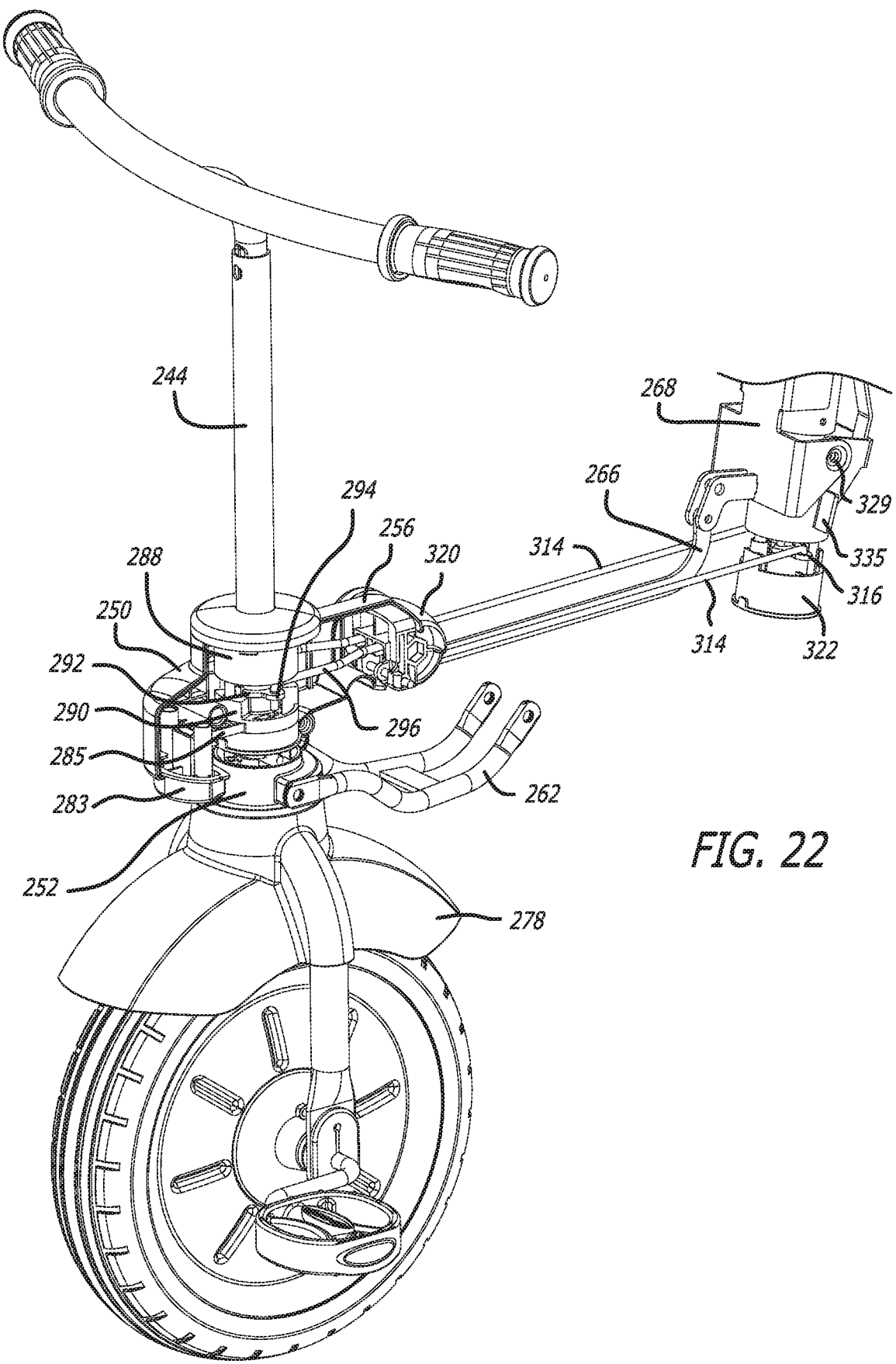
FIG. 22 is a partial front perspective cutaway view of the head tube housing, parent steer connection area and frame components for the foldable tricycle of FIG. 9.

As best shown in FIGS. 21-23, some of the drive components of the parent steer assembly 258 are supported by a housing 322 connected to the main frame 214. For example, the housing 322 supports a drive coupling 325 that operatively drives the rear steering flange 316. As explained above, the rear steering rods 314 are connected to the rear steering flange 316. And, the rear steering flange 316 is driven by a drive shaft 328 that is driven by the drive coupling 325 operatively driven by the removable parent steer handle 318.

Other components of the parent steer assembly 258 and the second release mechanism 255 are housed within the outer steer housing 334 as shown in FIGS. 14 and 17-20, which is supported by the seat backplate 268. As explained above, the seat backplate 268 is pivotally connected to the main frame 214 at the tabs 274 extending from the main frame 214 as shown in FIG. 21. Additionally, the seat backplate 268 is pivotally connected to the rear linkage 266.

Figure 13:
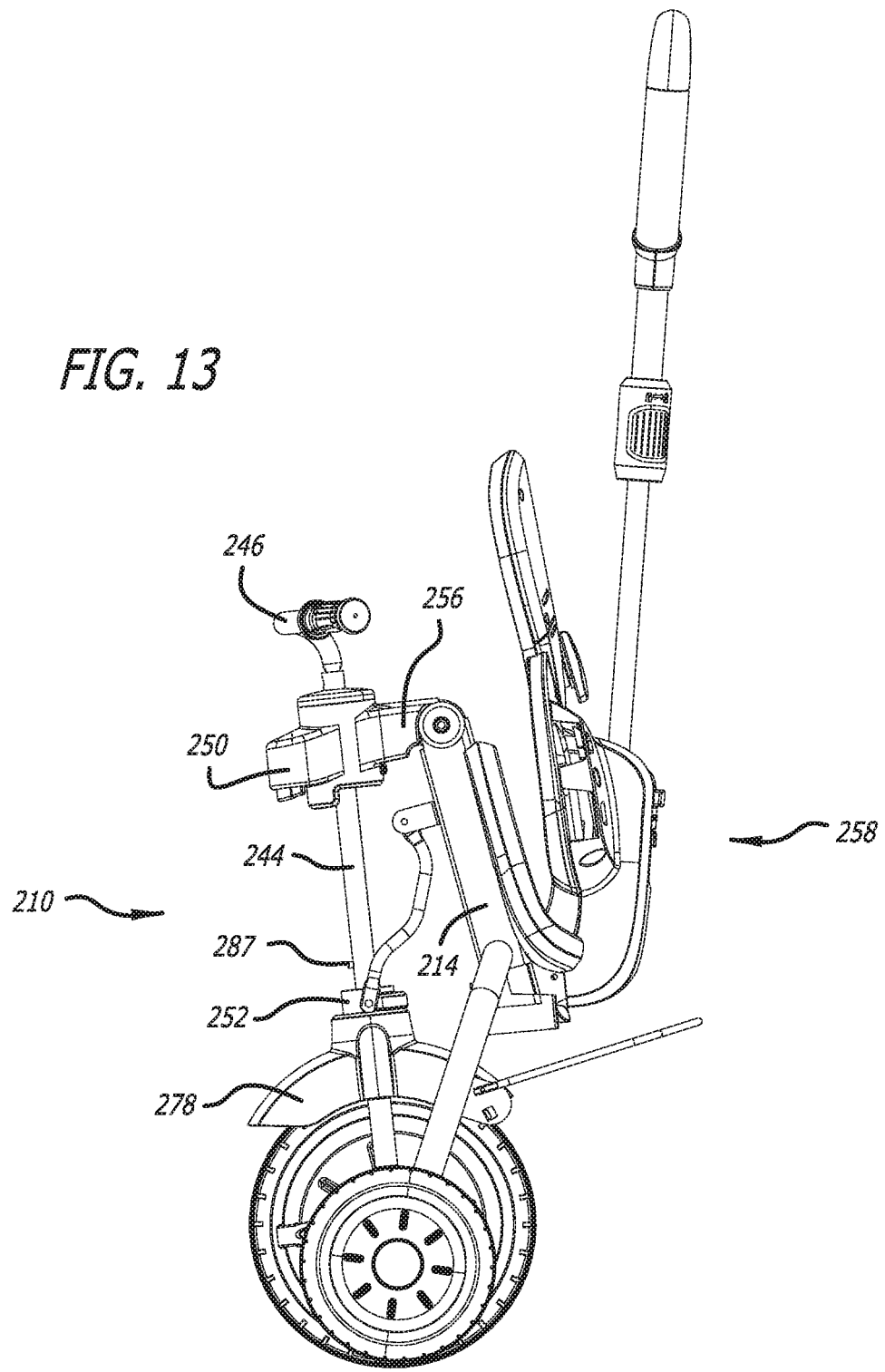
FIG. 13 is a side elevation view of the foldable tricycle of FIG. 9 in the fully folded configuration.
Figure 17:
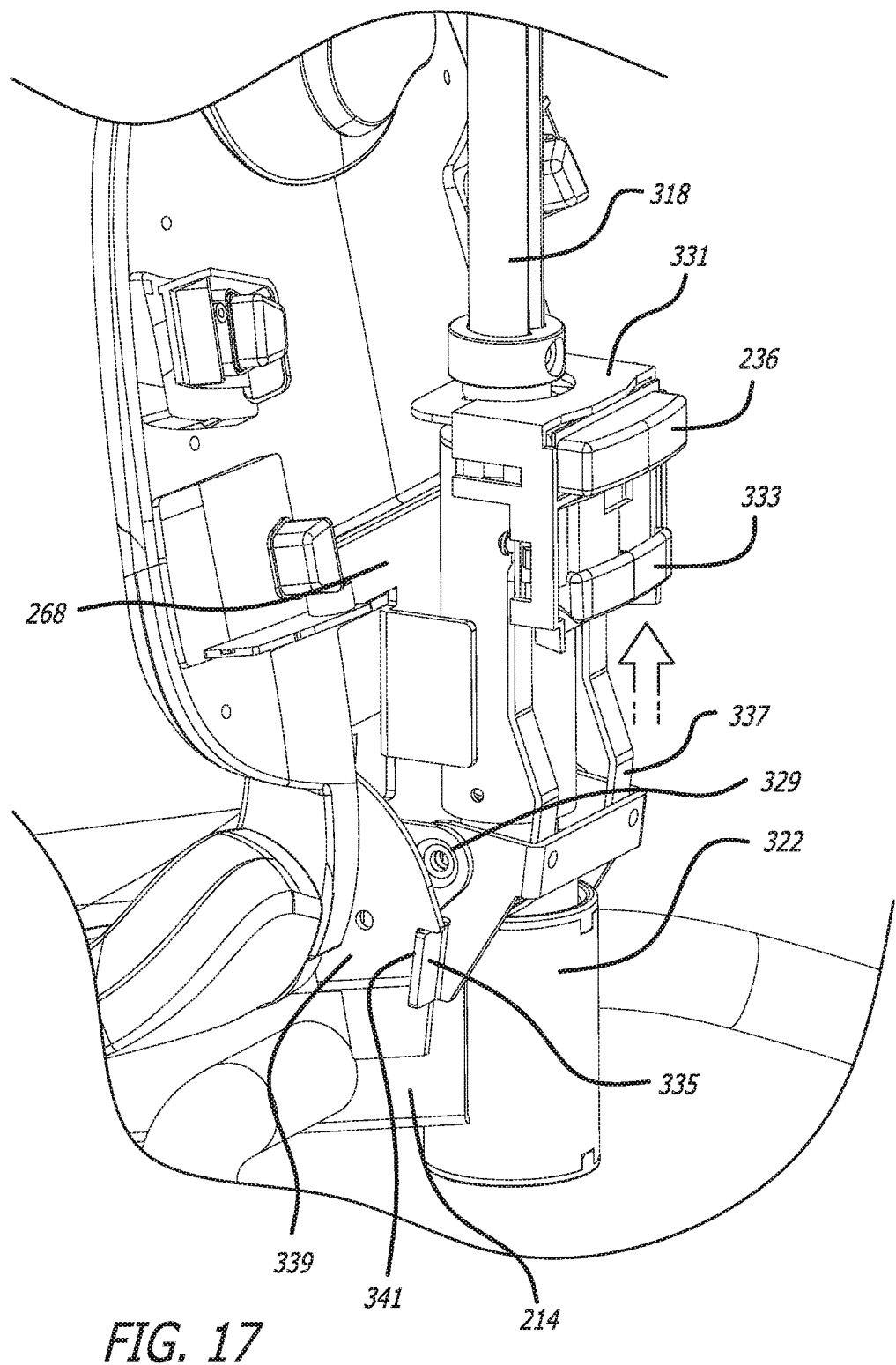
FIG. 17 is a partial rear perspective view of the rear release mechanism for the foldable tricycle of FIG. 9.
Figure 18:
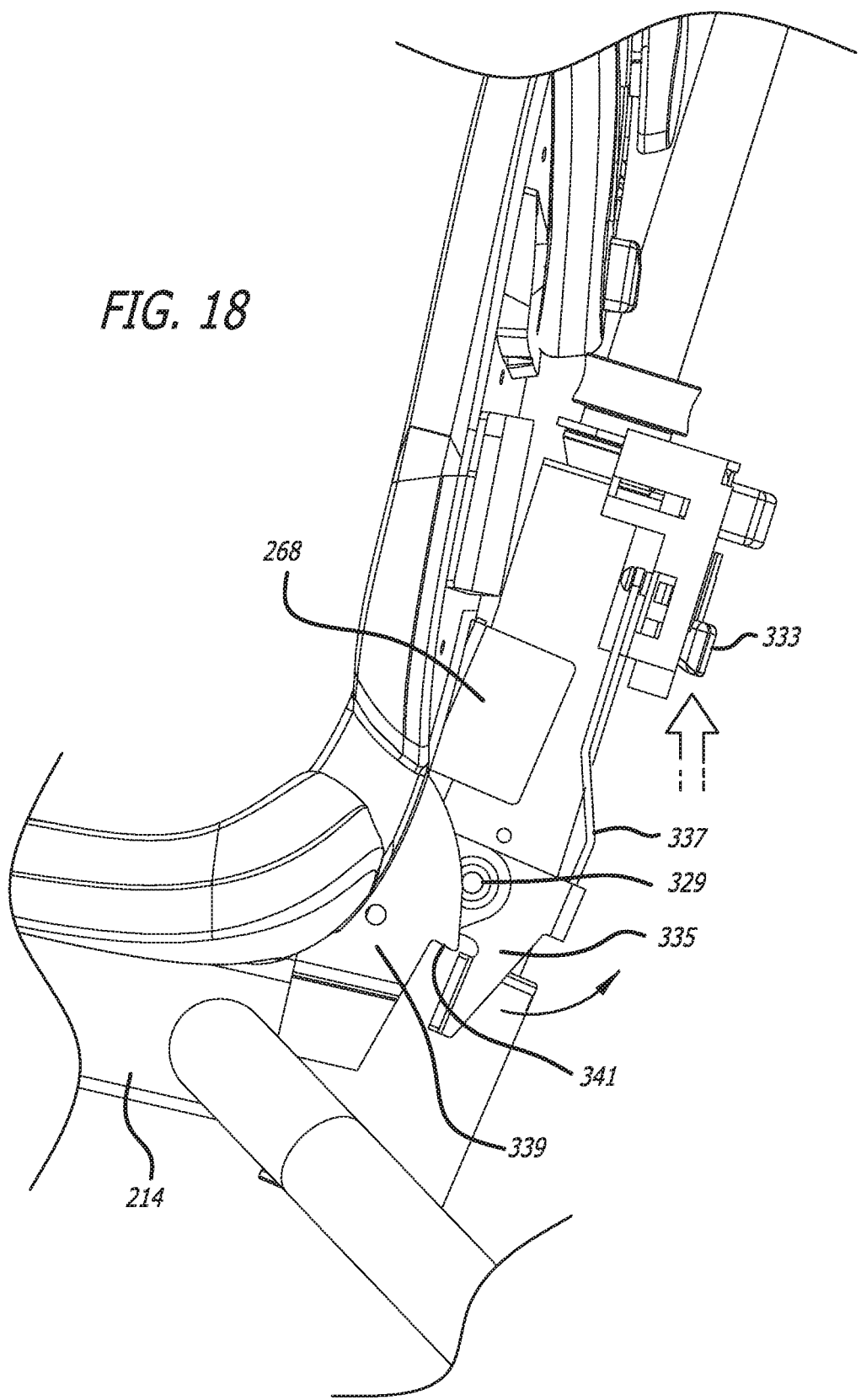
FIG. 18 is a partial side view of the rear release mechanism for the foldable tricycle of FIG. 9, in the released position.
Figure 20:
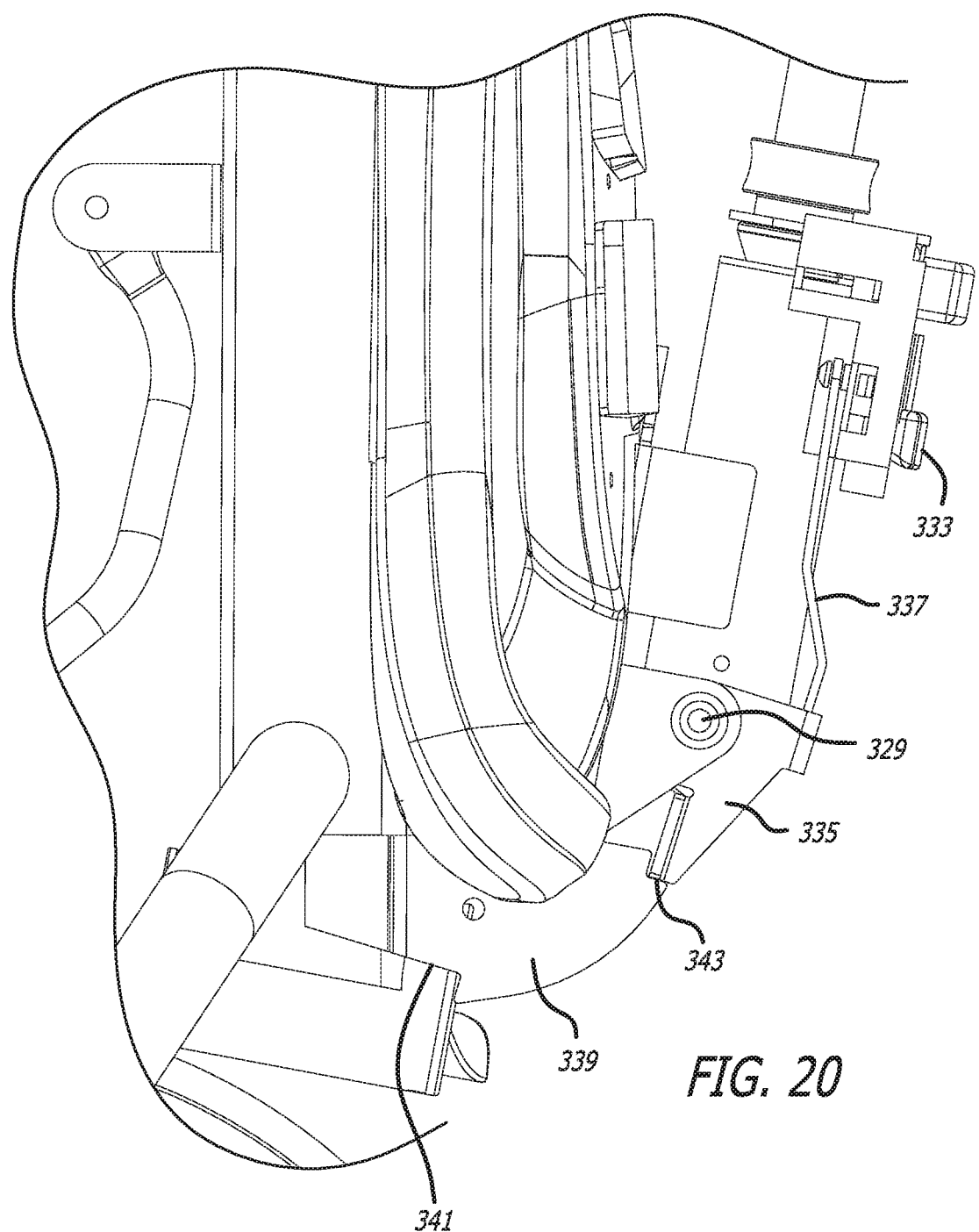
FIG. 20 is a closer view of the rear release mechanism of FIG. 19, in the locked position when the tricycle is in the folded position.

In one embodiment, the second release mechanism 255 comprises a base 331 connected to the seat backplate 268, a release button 333 extending from the base 331, a release member 335 connected to the release button 333 via release arms 337, and a receiver 339 extending from the frame 214. The release member 335 is also pivotally attached to the seat backplate 268 at pivot points 329. The receiver 339 has a first receiving position 341 and a second receiving position 343. In one embodiment, the first and second receiving positions 341, 343 are notches in the receiver 339 that are engaged by the spring-biased release member 335. The release member 335 is configured to engage the receiver 339 at the first receiving position 341 to lock the second release mechanism 255 and the tricycle 210 in the use position, which is referred to as the first lock position, and additionally to be transitioned to engage the receiver 339 at the second receiving position 343 to lock the second release mechanism 255 and the tricycle 210 in the folded position, which is referred to as the second lock position. As shown in FIGS. 17-21, and particularly the progression illustrations of FIGS. 17-20, in the use position and prior to the actuation of the release button 33, the release member 335 is positioned in the first receiving position 341 of the receiver 339 in the first lock position. The first step to operating the second release mechanism 255 to transition the tricycle from the use position to the folded position is to actuate the release button 333, as shown in FIG. 18, which operates to rotate as shown in FIG. 17 By actuating or raising the release button 333, the release member 335 is pivoted away from the receiver 339 to disengage the seat back 272 from the frame 214. The seat back 272 can then be pivoted about its pivoting connection with the tabs 274 of the frame 214 to transition to the folded position as shown in FIGS. 19 and 20. When fully rotated, the release member 335 will engage the second receiving position 343 of the receiver 339, i.e., the lock position, to lock the second release mechanism 255 and the tricycle 210 in the folded position. It is understood that the rear linkage 266 also operates to pull and rotate the seat back 272 toward the folded position as the frame 214 pivots at the pivot assembly between the frame 214 and the upper head tube housing 250. In one embodiment the tricycle is pivotable about the pivot assembly to transition between the use position and the folded position. In the folded position the three wheels of the tricycle 210 operate as a tripod to maintain the tricycle 210 standing upright as shown in FIG. 13 when the tricycle 210 is in the closed position.

The housing 334 covers the rear component of the parent steer assembly 258 that is supported by the seat backplate 268. The housing 334 also contains a pushbutton release member 236 that operates to release the parent steer handle 318 from being locked in the parent steer assembly 258.

The parent steer handle 318 can be used by a parent to steer the tricycle 210, especially in the stroller mode for use with a young child. In one embodiment, the parent steer handle 318 is able to still be connected to the tricycle 210 during folding of the tricycle 210 (see FIG. 13), however, in an alternate embodiment the parent steer handle 318 can be removed from the tricycle 210 for use and/or folding. In another embodiment, the length of the parent steer handle 318 can be made adjustable, for example by providing an upper shaft 318a, a lower shaft 318b, and a coupling assembly 319 between the upper and lower shafts. In one embodiment the parent steer handle 318 is secured to the tricycle and cannot be removed without releasing a lock that holds the parent steer handle 318 in the outer housing 334. A release button 236 is provided to release the lock and allow the parent steer handle 318 to be removed from the tricycle 210.

In one embodiment, the tricycle 210 may also have a container (not shown in the embodiment of FIGS. 9-21), such as a bag or other storage device, that is secured via a frame 362 between the first and second legs 238, 242 for storing items. In one embodiment the container would be preferably secured to both the container frame 162, at the bottom of the container, and to some other portion of the tricycle 210 at the top portion of the container, such as the seat backplate 268. Accordingly, in one embodiment when the frame of the tricycle begins to rotate during folding of the frame, the connection of the container to the seat backplate 268, or some other portion of the tricycle frame, will cause the container frame to rotate therewith. The container or storage device may be formed of a combination of fabric, foam, plastic, and/or other materials.

To fold the tricycle 210, the first step is to actuate both the first release mechanism 254 and the second release mechanism 255. In short, the first release mechanism 254 allows the upper head tube housing 250 to axially slide up the stem 244 to pivot the frame 214, and the second release mechanism 255 allows the seat back 272 to pivot forward to the folded position against the seat bottom 270. It is also understood that in one embodiment actuation of both the first and the second release mechanisms 254, 255 are required to eliminate binding of the tricycle and allow for proper axial sliding of the upper head tube housing 250 on the stem 244.

Accordingly, to actuate the first release mechanism 254, in one embodiment, the user pushes upwardly on the release button 283. When the release button 283 is pushed up it translates the locking plate 285 to push in the locking pin 287 and release the upper head tube housing 250 to allow for axial sliding movement of the upper head tube housing 250 about the stem 244. In this manner the upper head tube housing 250 is disassociated from the fixed lower head tube housing 252. The user also operates the second release mechanism 255 be lifting up on the release button 333 which operates to pivot the release member 335 out of engagement with the first receiving position 341 of the receiver 339 for pivoting of the seat back 272 toward the seat bottom 270. When both release mechanisms 254, 255 have been actuated the seat back 272 of the tricycle 210 can be pivoted into the folded orientation and the upper head tube housing 250 can be slid upwardly to pivot the frame 214 into its folded position. As the upper head tube housing 250 is slid upwardly on the handlebar stem 244, as shown in FIG. 12, the front end 218 of the frame 214 will also be raised and will pivot at its pivoting connection with the extension 256 of the upper head tube housing 250.

Figure 12:
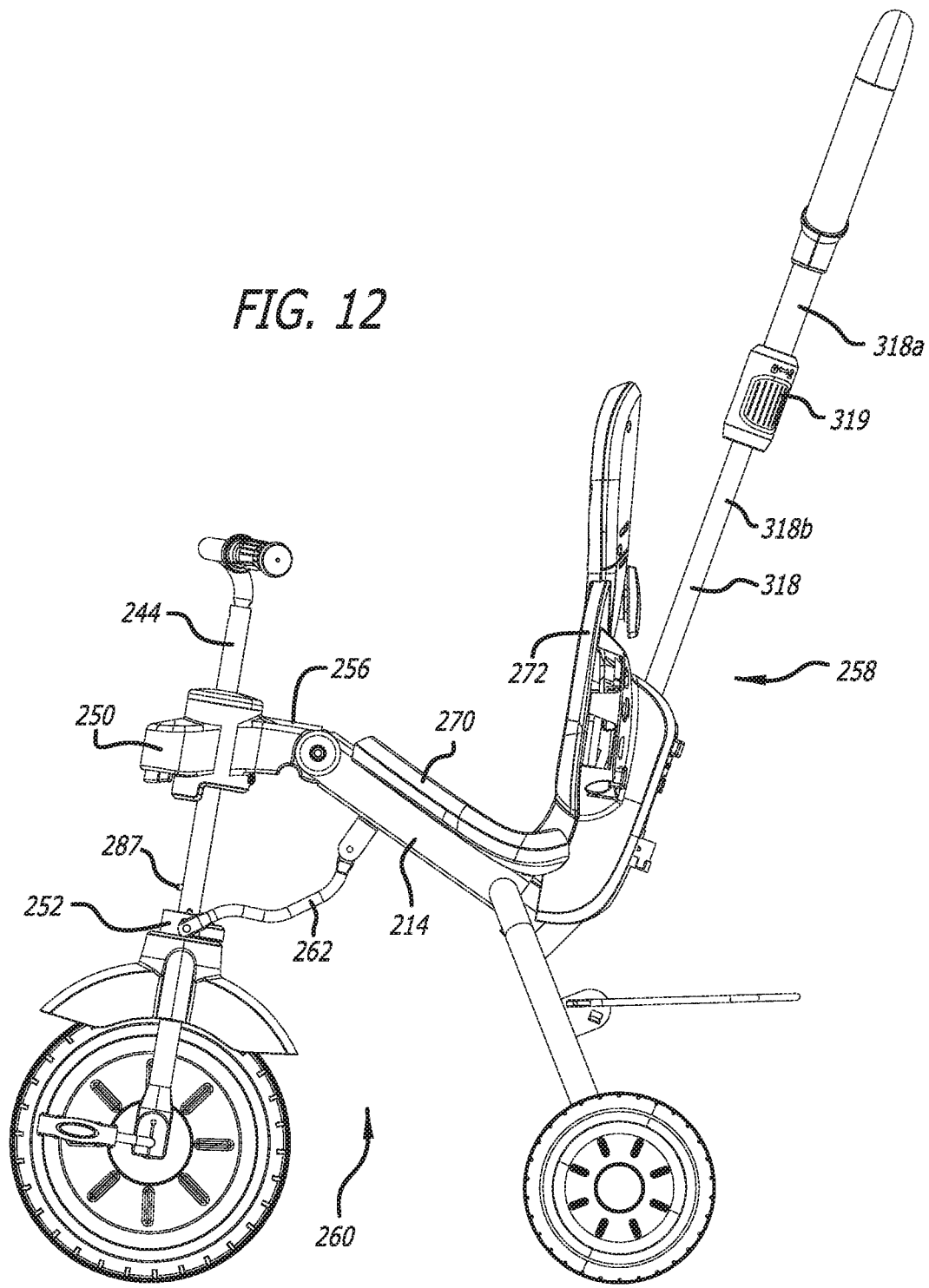
FIG. 12 is a side elevation view of the foldable tricycle of FIG. 9 in the partially folded configuration.

The pivoting connections of the various components of the previously described sliding linkage mechanism will cause the rear wheels to fold inwardly toward the front wheel of the tricycle as the upper head tube housing 250 is raised as shown in FIG. 12. In one embodiment, to fully fold the tricycle 210 the rear section of the tricycle is pushed toward the front wheel to transition the tricycle from the partially folded orientation shown in FIG. 12 to the fully folded orientation shown in FIG. 13. In one embodiment the link rod 262 operates as an over-center linkage so that the tricycle 10 will be somewhat restrained in the folded configuration until a sufficient force is provided to overcome the over center force to return the tricycle 210 to the unfolded or open configuration. Alternately, or additionally, in the folded position the second release mechanism 255 will operate to lock the tricycle 210 tricycle in the folded position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A foldable tricycle that can be manipulated between a use position and a non-use folded position, comprising:
   a frame having a first end and a second end, the second end supporting at least one rear wheel;
   a seat connected to the frame;
   a head tube housing adjacent the first end of the frame;
   a fork adjacent the first end of the tricycle and a front wheel rotatedly secured to the fork; and,
   a stem fixedly connected to the fork in the use position and during transition to the nonuse folded position, the stem supporting a handlebar, wherein a portion of the head tube housing is slidingly connected to the stem, and wherein the tricycle can be manipulated between the use position and the non-use folded position by sliding a portion of the head tube along the stem and toward the handlebar without removing the stem from the head tube, and by having a rear portion of the frame pivot with respect to a front portion of the frame.

2. The foldable tricycle of claim 1, wherein the head tube housing comprises an upper head tube housing and a lower head tube housing, wherein the upper head tube housing is slidingly connected to the stem, and wherein the frame can be repositioned from a use position to a folded position by sliding the upper head tube housing toward the handlebar.

3. The foldable tricycle of claim 1, wherein the portion of the head tube housing that is slidingly connected to the stem is able to traverse axially about a length of the stem.

4. The foldable tricycle of claim 1, further comprising a first release mechanism adjacent the first end of the frame, and a second release mechanism adjacent the second end of the frame, wherein the tricycle can be manipulated between the use position and the folded position following actuation of the first and second release mechanisms.

5. The foldable tricycle of claim 4, wherein the first release mechanism comprises a release button, a locking plate engageable by the release button, and a locking pin, and wherein the locking plate operates to transition the locking pin from a locked position to an unlocked position to allow the head tube housing to slide axially on the stem.

6. The foldable tricycle of claim 1, further comprising a pivot assembly between the frame and the head tube, wherein the tricycle is pivotable about the pivot assembly to transition between the use position and the folded position.

7. The foldable tricycle of claim 6, further comprising a steering handle removably secured adjacent the second end of the frame, a first end of a rear steering rod operably connected to the parent steer handle, and a first end of a forward steering rod operably connected to the fork, wherein a second end of the rear steering rod is pivotally connected to a second end of the forward steering rod to provide for steering capabilities in a folding tricycle.

8. A foldable tricycle comprising:
   a frame having a first end and a second end;
   a front wheel adjacent the first end of the tricycle, the front wheel being supported by a fork;
   a rear wheel adjacent the second end of the tricycle;
   a pivot assembly adjacent a first end of the frame, wherein the tricycle is pivotable about the pivot assembly to transition between a use position and a non-use folded position, and wherein the fork and frame are in different relative locations in the non-use folded position and the use position; and,
   a release mechanism adjacent the second end of the frame, wherein the release mechanism has a first lock position to retain the tricycle in the use position, and wherein the release mechanism has a second lock position to retain the tricycle in the non-use folded position.

9. The foldable tricycle of claim 8, wherein the release mechanism comprises a release button, a receiver connected to the frame, the receiver having a first receiving position and a second receiving position, and a release member, the release button being connected to the release member to have the release member separately engage the receiver in the first receiving position and the second receiving position.

10. The foldable tricycle of claim 9, further comprising a seat, the seat having a seat bottom and a seat back, the seat bottom being secured to the frame, and the seat back being pivotally connected to the frame, wherein the release member is connected to the seat back.

11. The foldable tricycle of claim 9, wherein the release member is engaged with the receiver in the first receiving position when the tricycle is locked in the use position, and wherein the release member is engaged with the receiver in the second receiving position when the tricycle is locked in the folded position.

12. The foldable tricycle of claim 8, wherein the release mechanism adjacent the second end of the frame is a second release mechanism, and further comprising a first release mechanism adjacent the first end of the frame, and wherein the tricycle can be manipulated between the use position and the folded position following actuation of the first and second release mechanisms.

13. The foldable tricycle of claim 8, further comprising a head tube housing adjacent the first end of the main frame, and a stem extending from the fork and supporting a handlebar, wherein a portion of the head tube housing is slidingly connected to the stem, and wherein the tricycle can be manipulated between the use position and the folded position by sliding a portion of the head tube axially about the step toward the handlebar.

14. A foldable tricycle comprising:
   a frame having a first end and a second end, the second end operably supporting at least one rear wheel;
   a seat connected to the frame;

a head tube housing adjacent the first end of the frame;

a fork rotatedly secured to the tricycle, the fork rotatedly supporting a front wheel;

a first release mechanism adjacent the head tube housing, the first release mechanism having a release button that is actuated by a user; and, a second release mechanism adjacent the second end of the frame, the second release mechanism having a release button that is actuated by a user, wherein the tricycle can be manipulated between a use position and a folded position following actuation of the first and second release mechanisms.

15. The foldable tricycle of claim 14, wherein the first release mechanism further comprises, a locking plate engageable by the release button, and a locking pin, and wherein the locking plate operates to transition the locking pin from a locked position to an unlocked position to allow the head tube housing to slide axially on the stem.

16. The foldable tricycle of claim 14, wherein the second release mechanism further comprises, a receiver connected to the frame, the receiver having a first receiving position, and a release member, the release button being connected to the release member to have the release member selectively disengage the receiver at the first receiving position to allow a back of the seat to pivot toward a bottom of the seat.

17. The foldable tricycle of claim 16, wherein the receiver further has a second receiving position, the release member securing the back of the seat in a folded position almost parallel to the bottom of the seat when the release member is secured in the second receiving position of the receiver.

18. The foldable tricycle of claim 14, wherein the first release mechanism and the second release mechanism both must be actuated to transition the tricycle to the folded position.

19. A foldable tricycle comprising:

a frame having a first end and a second end;

a fork adjacent the first end of the tricycle and a front wheel rotatedly secured to the fork;

a rear wheel adjacent the second end of the tricycle;

a pivot assembly adjacent a first end of the frame, wherein the tricycle is pivotable about the pivot assembly to transition between a use position and a non-use folded position;

and, a release mechanism having a lock that prevents the pivot assembly from pivoting the frame to transition the tricycle to the non-use folded orientation when the lock is in a first lock position, and the release mechanism transitioning the lock to a second position upon actuation of the release mechanism to allow the pivot assembly to pivot the frame to transition the tricycle to the non-use folded position from the use position, the lock being positioned in another lock position when the frame is in the non-use folded position to prevent the frame from transitioning the tricycle from the non-use folded position the use position until the release mechanism is actuated.

20. The foldable tricycle of claim 19, further comprising a stem extending from the fork and supporting a handlebar, and a head tube housing adjacent the first end of the main frame, wherein a portion of the head tube housing is slidingly connected to the stem, and wherein the tricycle can be manipulated between the use position and the non-use folded position by sliding a portion of the head tube toward the handlebar.

21. The foldable tricycle of claim 20, wherein the head tube housing comprises an upper head tube housing and a lower head tube housing, wherein the upper head tube housing is slidingly connected to the stem, and wherein the frame can be repositioned from the use position to the non-use folded position by sliding the upper head tube housing toward the handlebar.

22. Foldable tricycle of claim 19, further comprising a first release mechanism adjacent the first end of the frame, and a second release mechanism adjacent the second end of the frame, wherein the tricycle can be manipulated between the use position and the non-use folded position following actuation of the first and second release mechanisms.

* * * * *